(12) United States Patent
Uchida

(10) Patent No.: US 11,248,818 B2
(45) Date of Patent: Feb. 15, 2022

(54) SERVER, AIR CONDITIONING CONTROL SYSTEM, RECORDING MEDIUM, AND CONTROL METHOD

(71) Applicant: SHARP KABUSHIKI KAISHA, Sakai (JP)

(72) Inventor: Keisuke Uchida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/010,747

(22) Filed: Sep. 2, 2020

(65) Prior Publication Data

US 2021/0071892 A1 Mar. 11, 2021

(30) Foreign Application Priority Data

Sep. 9, 2019 (JP) .............................. JP2019-163825

(51) Int. Cl.
*F24F 11/46* (2018.01)
*F24F 11/30* (2018.01)
(Continued)

(52) U.S. Cl.
CPC ............. *F24F 11/46* (2018.01); *F24F 11/30* (2018.01); *F24F 11/54* (2018.01); *F24F 11/56* (2018.01);
(Continued)

(58) Field of Classification Search
CPC .. F24F 11/46; F24F 11/54; F24F 11/56; F24F 11/61; F24F 11/64; F24F 11/67; F24F 11/80; F24F 11/30; F24F 2110/10; F24F 2110/12; F24F 2130/10; F24F 2130/20; F24F 2140/60; F24F 11/58; F24F 11/65; F24F 11/52; G05B 19/042; G05B 2219/2639; G05B 2219/2614
See application file for complete search history.

(56) References Cited

U.S. PATENT DOCUMENTS

2007/0044501 A1* 3/2007 Schnell ............... F24D 19/1084
 62/331
2011/0029136 A1* 2/2011 Altonen .................... E06B 9/68
 700/275

(Continued)

FOREIGN PATENT DOCUMENTS

JP 2010-065960 A 3/2010

*Primary Examiner* — Charles R Kasenge
(74) *Attorney, Agent, or Firm* — ScienBiziP, P.C.

(57) ABSTRACT

Provided is a server that communicates, via a network, with at least one air conditioner that executes a normal operation or a loosening operation includes a determination unit that determines a heat exposure period for each air conditioning target space, the indoor solar irradiance information indicating a transition of solar irradiance, and the heat exposure period being a time duration in which an environment in the air conditioning target space is likely to be influenced by solar radiation, a generation unit that generates operation plan information of designating a loosening operation period, the loosening operation period being a time duration in which the air conditioner is caused to execute the loosening operation, and a supply unit that supplies the operation plan information to the air conditioner via the network to cause the air conditioner to execute the loosening operation in the loosening operation period.

8 Claims, 17 Drawing Sheets

(51) Int. Cl.
  *F24F 11/54* (2018.01)
  *F24F 11/56* (2018.01)
  *F24F 11/61* (2018.01)
  *F24F 11/64* (2018.01)
  *F24F 11/67* (2018.01)
  *F24F 11/80* (2018.01)
  *G05B 19/042* (2006.01)
  *F24F 110/10* (2018.01)
  *F24F 110/12* (2018.01)
  *F24F 130/10* (2018.01)
  *F24F 130/20* (2018.01)
  *F24F 140/60* (2018.01)

(52) U.S. Cl.
  CPC .............. *F24F 11/61* (2018.01); *F24F 11/64* (2018.01); *F24F 11/67* (2018.01); *F24F 11/80* (2018.01); *G05B 19/042* (2013.01); *F24F 2110/10* (2018.01); *F24F 2110/12* (2018.01); *F24F 2130/10* (2018.01); *F24F 2130/20* (2018.01); *F24F 2140/60* (2018.01); *G05B 2219/2639* (2013.01)

(56) References Cited

U.S. PATENT DOCUMENTS

| | | | |
|---|---|---|---|
| 2011/0029139 A1* | 2/2011 | Altonen | H05B 47/11 700/278 |
| 2011/0031806 A1* | 2/2011 | Altonen | H04L 12/14 307/32 |
| 2011/0035061 A1* | 2/2011 | Altonen | H05B 47/11 700/278 |
| 2012/0091213 A1* | 4/2012 | Altonen | H02J 3/12 236/51 |
| 2012/0091804 A1* | 4/2012 | Altonen | H05B 47/19 307/31 |
| 2012/0095601 A1* | 4/2012 | Abraham | H05B 47/11 700/278 |
| 2012/0133287 A1* | 5/2012 | Steiner | G01J 1/16 315/158 |
| 2013/0113284 A1* | 5/2013 | Altonen | F24F 11/30 307/31 |
| 2013/0226351 A1* | 8/2013 | Altonen | G05D 23/1919 700/275 |
| 2015/0171630 A1* | 6/2015 | Altonen | H04L 12/40013 307/32 |
| 2018/0181085 A1* | 6/2018 | Gabriel | G05B 15/02 |
| 2018/0287385 A1* | 10/2018 | Altonen | F24F 11/62 |
| 2020/0025402 A1* | 1/2020 | Bell | G05D 23/1904 |
| 2020/0217132 A1* | 7/2020 | Chang | G05B 15/02 |
| 2020/0370779 A1* | 11/2020 | Matsumoto | F24F 11/58 |
| 2021/0096521 A1* | 4/2021 | Gabriel | F24F 11/63 |

* cited by examiner

FIG. 5

| DATE AND TIME | INDOOR SOLAR IRRADIANCE ($MJ/m^2$) |
|---|---|
| 2018/11/26 0:00 | 0.00 |
| 2018/11/26 0:15 | 0.00 |
| 2018/11/26 0:30 | 0.00 |
| 2018/11/26 0:45 | 0.00 |
| 2018/11/26 1:00 | 0.00 |
| 2018/11/26 1:15 | 0.00 |
| ⋮ | ⋮ |
| 2018/11/26 6:00 | 0.00 |
| 2018/11/26 6:15 | 0.00 |
| 2018/11/26 6:30 | 0.00 |
| 2018/11/26 6:45 | 0.01 |
| 2018/11/26 7:00 | 0.01 |
| 2018/11/26 7:15 | 0.02 |
| 2018/11/26 7:30 | 0.03 |
| 2018/11/26 7:45 | 0.03 |
| ⋮ | ⋮ |
| 2018/11/26 11:00 | 0.05 |
| 2018/11/26 11:15 | 0.05 |
| 2018/11/26 11:30 | 0.06 |
| 2018/11/26 11:45 | 0.07 |
| 2018/11/26 12:00 | 0.10 |
| 2018/11/26 12:15 | 0.15 |
| 2018/11/26 12:30 | 0.25 |
| 2018/11/26 12:45 | 0.28 |
| ⋮ | ⋮ |
| 2018/11/26 18:30 | 0.03 |
| 2018/11/26 18:45 | 0.02 |
| 2018/11/26 19:00 | 0.01 |
| 2018/11/26 19:15 | 0.00 |
| ⋮ | ⋮ |
| 2018/11/26 23:45 | 0.00 |

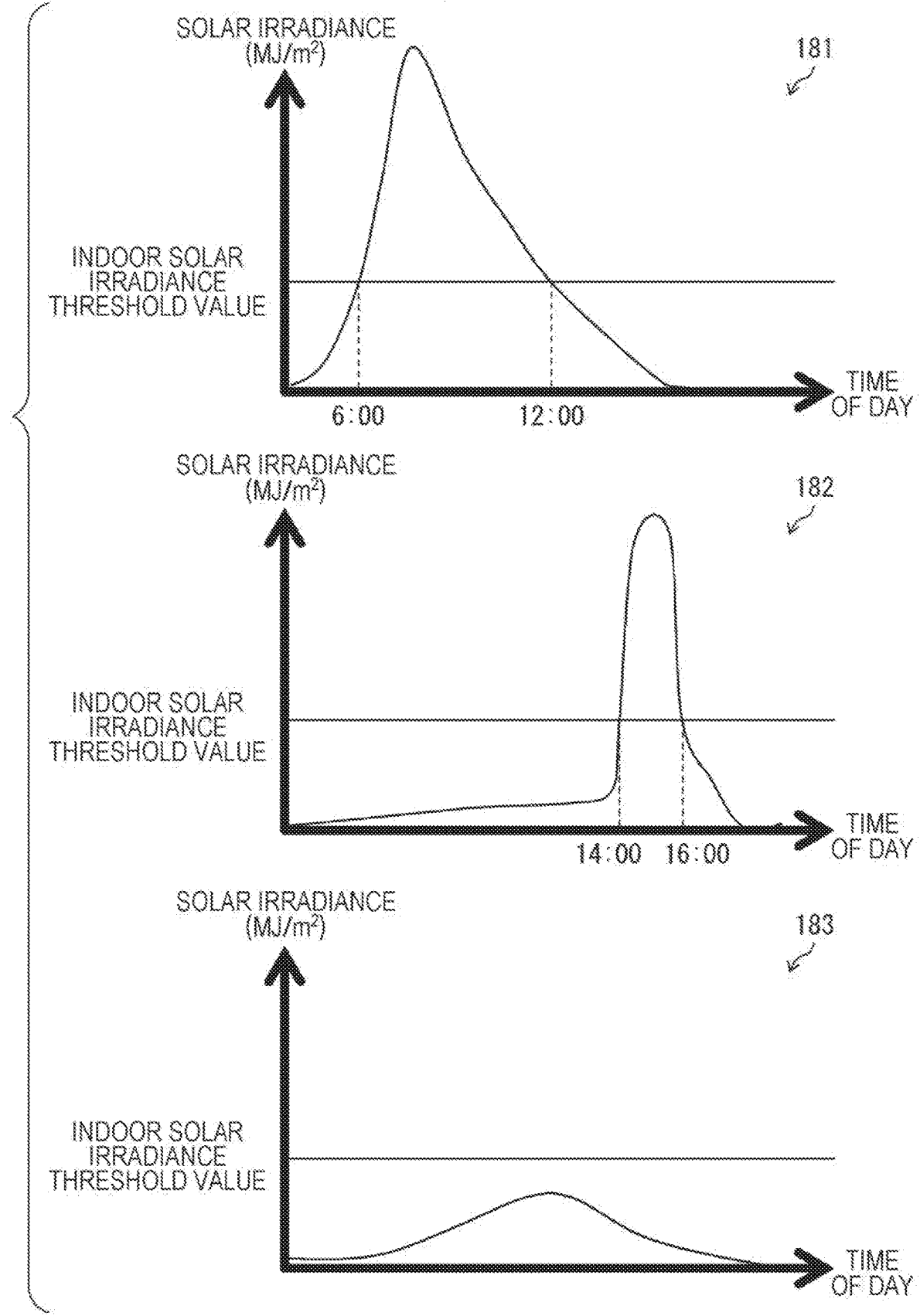

FIG. 7

| CONTROL TARGET INFORMATION | | | | ENVIRONMENTAL IMPACT CHARACTERISTICS | | |
|---|---|---|---|---|---|---|
| USER ID | TERMINAL ID | AIR CONDITIONER ID | POSTAL CODE | EXTRACTION PERIOD | WEATHER | HEAT EXPOSURE PERIOD |
| U123456 (MR/MISS/MRS A) | T987654 | A246810 | 012-3456 | PREVIOUS DAY | SUNNY | 6:30 TO 12:15 |
| | | | | LATEST ONE MONTH | SUNNY | 6:00 TO 12:00 |
| | | | | LATEST ONE MONTH | CLOUDY | 10:00 TO 11:00 |
| | | | | LATEST ONE MONTH | RAIN | NONE |
| U123457 (MR/MISS/MRS B) | T987655 | A246811 | 012-3456 | PREVIOUS DAY | SUNNY | 14:15 TO 16:30 |
| | | | | LATEST ONE MONTH | SUNNY | 14:00 TO 16:00 |
| | | | | LATEST ONE MONTH | CLOUDY | 14:30 TO 15:00 |
| | | | | LATEST ONE MONTH | RAIN | NONE |
| U123458 (MR/MISS/MRS C) | T987656 | A246812 | 012-3456 | PREVIOUS DAY | SUNNY | NONE |
| | | | | LATEST ONE MONTH | SUNNY | NONE |
| | | | | LATEST ONE MONTH | CLOUDY | NONE |
| | | | | LATEST ONE MONTH | RAIN | NONE |
| ⋮ | ⋮ | ⋮ | ⋮ | ⋮ | ⋮ | ⋮ |

FIG. 8

| LOCATION | 〒012-3456 A PREFECTURE B CITY C TOWN | | | | | | | | | | | | | | | | | | | | | | | | |
|---|---|---|---|---|---|---|---|---|---|---|---|---|---|---|---|---|---|---|---|---|---|---|---|---|---|
| ISSUING DATE AND TIME | (ISSUED ON 2018/11/27 17:00) | | | | | | | | | | | | | | | | | | | | | | | | |
| DATE | 2018/11/28 | | | | | | | | | | | | | | | | | | | | | | | | |
| TIME OF DAY | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
| WEATHER | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | SUNNY | CLOUDY | CLOUDY | CLOUDY |
| AIR TEMPERATURE (°C) | 12.6 | 12.1 | 12.1 | 12.2 | 11.5 | 11.2 | 11.2 | 11.4 | 12.8 | 16.0 | 17.5 | 18.3 | 19.6 | 18.6 | 18.1 | 17.8 | 17.2 | 16.9 | 16.1 | 15.9 | 15.5 | 15.1 | 14.9 | 14.2 |
| HUMIDITY (%) | 77 | 80 | 79 | 79 | 80 | 80 | 81 | 82 | 76 | 65 | 61 | 54 | 44 | 49 | 53 | 55 | 64 | 62 | 64 | 66 | 69 | 74 | 74 | 75 |
| SOLAR IRRADIANCE (MJ/m²) | 0 | 0 | 0 | 0 | 0 | 0.1 | 0.2 | 0.3 | 0.58 | 1.29 | 1.46 | 1.87 | 1.96 | 1.46 | 0.73 | 0.27 | 0.25 | 0.2 | 0.1 | 0 | 0 | 0 | 0 | 0 |

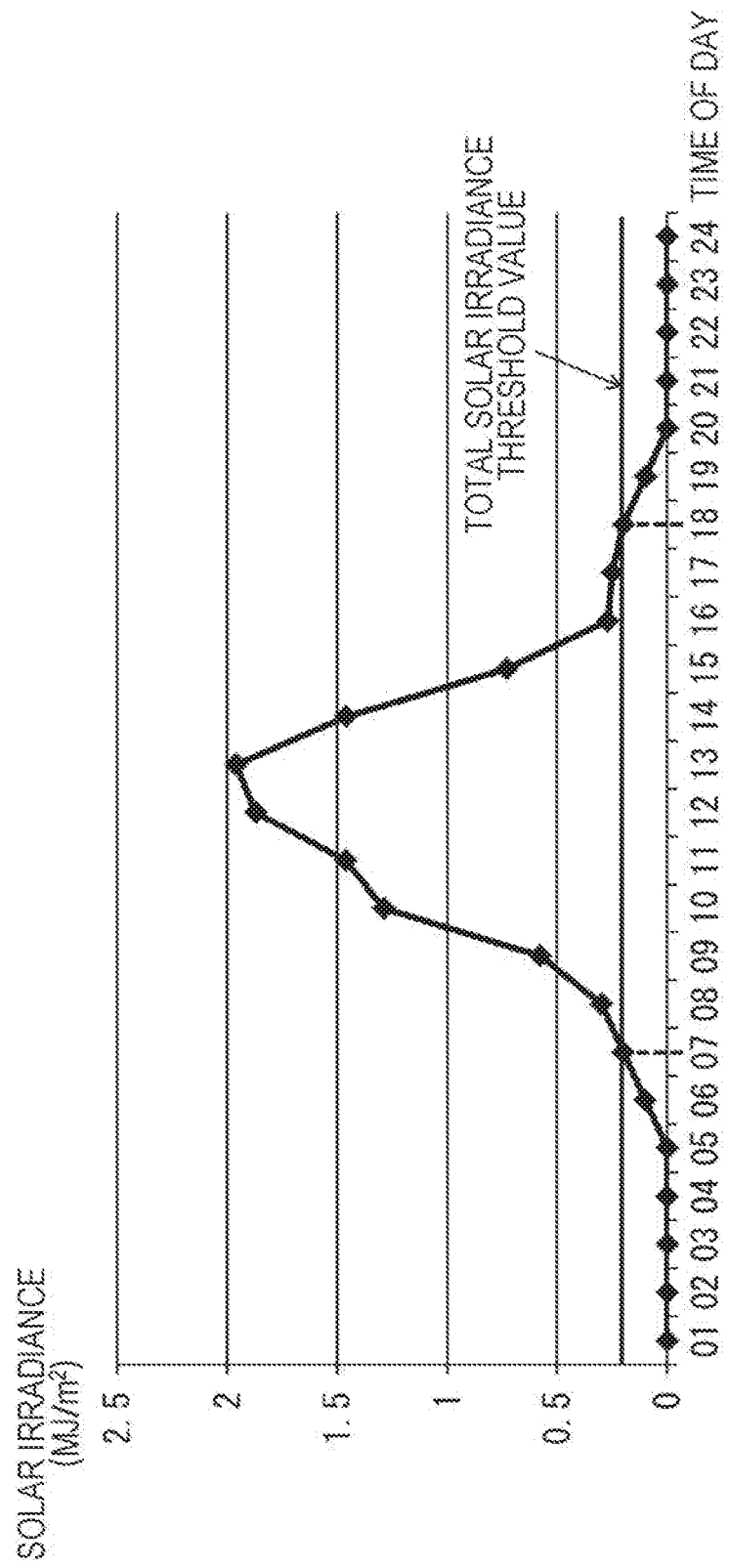

| SETTING CONDITION | SOLAR IRRADIANCE CONDITION | FIRST RULE |
|---|---|---|
| HEATING IS SET | WARMTH PERIOD AND HEAT EXPOSURE PERIOD PROVIDED | HEATING LOOSENING OPERATION IS PERFORMED FOR PERIOD FROM TIME POINT BEFORE 30 MINUTES FROM START TIME POINT OF OVERLAP PERIOD IN WHICH "WARMTH PERIOD" AND "HEAT EXPOSURE PERIOD" OVERLAP EACH OTHER, UNTIL END TIME POINT OF OVERLAP PERIOD |
| HEATING IS SET | NO WARMTH PERIOD OR NO HEAT EXPOSURE PERIOD | HEATING LOOSENING OPERATION IS NOT PERFORMED |
| COOLING IS SET | (NO CONDITION) | COOLING LOOSENING OPERATION IS PERFORMED FOR PERIOD FROM TIME POINT BEFORE 30 MINUTES FROM END TIME POINT OF "WARMTH PERIOD" UNTIL AM 6:00 ON NEXT DAY |

192

| CONTROL TARGET PERIOD | SECOND RULE |
|---|---|
| HEATING NORMAL OPERATION PERIOD | OPERATE IN ACCORDANCE WITH "SETTING TEMPERATURE" IN SETTING INFORMATION |
| HEATING LOOSENING OPERATION PERIOD | OPERATE BY SETTING "SETTING TEMPERATURE" TO "(SETTING TEMPERATURE IN SETTING INFORMATION −0.5°C)" |
| COOLING NORMAL OPERATION PERIOD | OPERATE IN ACCORDANCE WITH "SETTING TEMPERATURE" IN SETTING INFORMATION |
| COOLING LOOSENING OPERATION PERIOD | OPERATE BY SETTING "SETTING TEMPERATURE" TO "(SETTING TEMPERATURE IN SETTING INFORMATION +0.5°C)" |

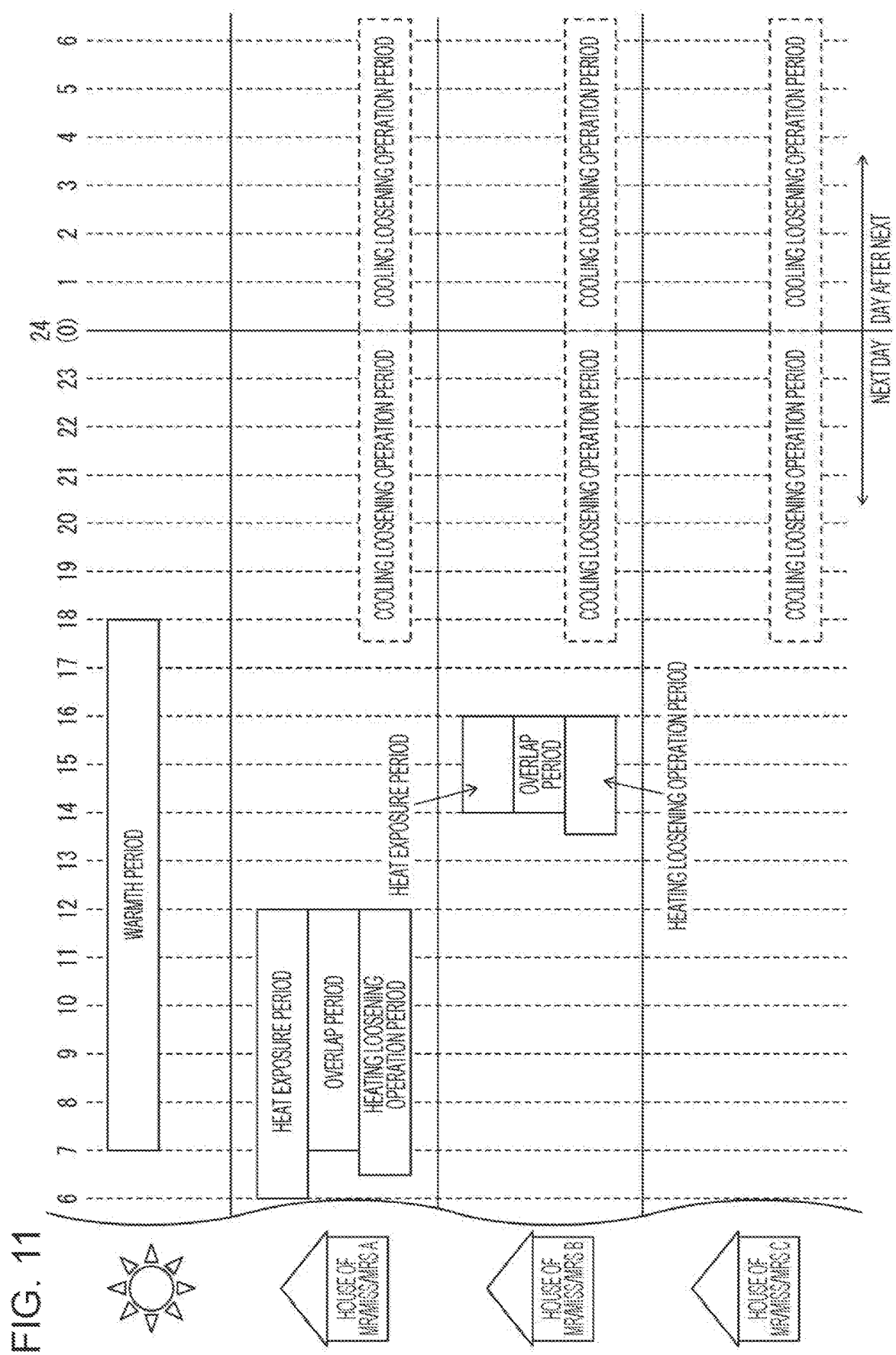

FIG. 13

| EXECUTION TARGET | | | EXECUTION DATE | CONTROL DATA ID | CONTROL TARGET PERIOD | OPERATION TYPE | OPERATION MODE | SETTING TEMPERATURE |
|---|---|---|---|---|---|---|---|---|
| USER ID | TERMINAL ID | AIR CONDITIONER ID | POSTAL CODE | | | | | |
| U123456 (MR/MISS/MRS A) | T987654 | A246810 | 012-3456 | 2018/11/28 | period01 | 2018/11/28 0:00 TO 6:30 | NORMAL OPERATION | HEATING | 22°C |
| | | | | | period02 | 2018/11/28 6:30 TO 12:00 | LOOSENING OPERATION | HEATING | 21.5°C |
| | | | | | period03 | 2018/11/28 12:00 TO 24:00 | NORMAL OPERATION | HEATING | 22°C |
| U123457 (MR/MISS/MRS B) | T987655 | A246811 | 012-3456 | 2018/11/28 | period01 | 2018/11/28 0:00 TO 13:30 | NORMAL OPERATION | HEATING | 24°C |
| | | | | | period02 | 2018/11/28 13:30 TO 16:00 | LOOSENING OPERATION | HEATING | 23.5°C |
| | | | | | period03 | 2018/11/28 16:00 TO 24:00 | NORMAL OPERATION | HEATING | 24°C |
| U123458 (MR/MISS/MRS C) | T987656 | A246812 | 012-3456 | 2018/11/28 | period01 | 2018/11/28 0:00 TO 24:00 | NORMAL OPERATION | HEATING | 25°C |
| ⋮ | ⋮ | ⋮ | ⋮ | ⋮ | ⋮ | ⋮ | ⋮ | ⋮ | ⋮ |

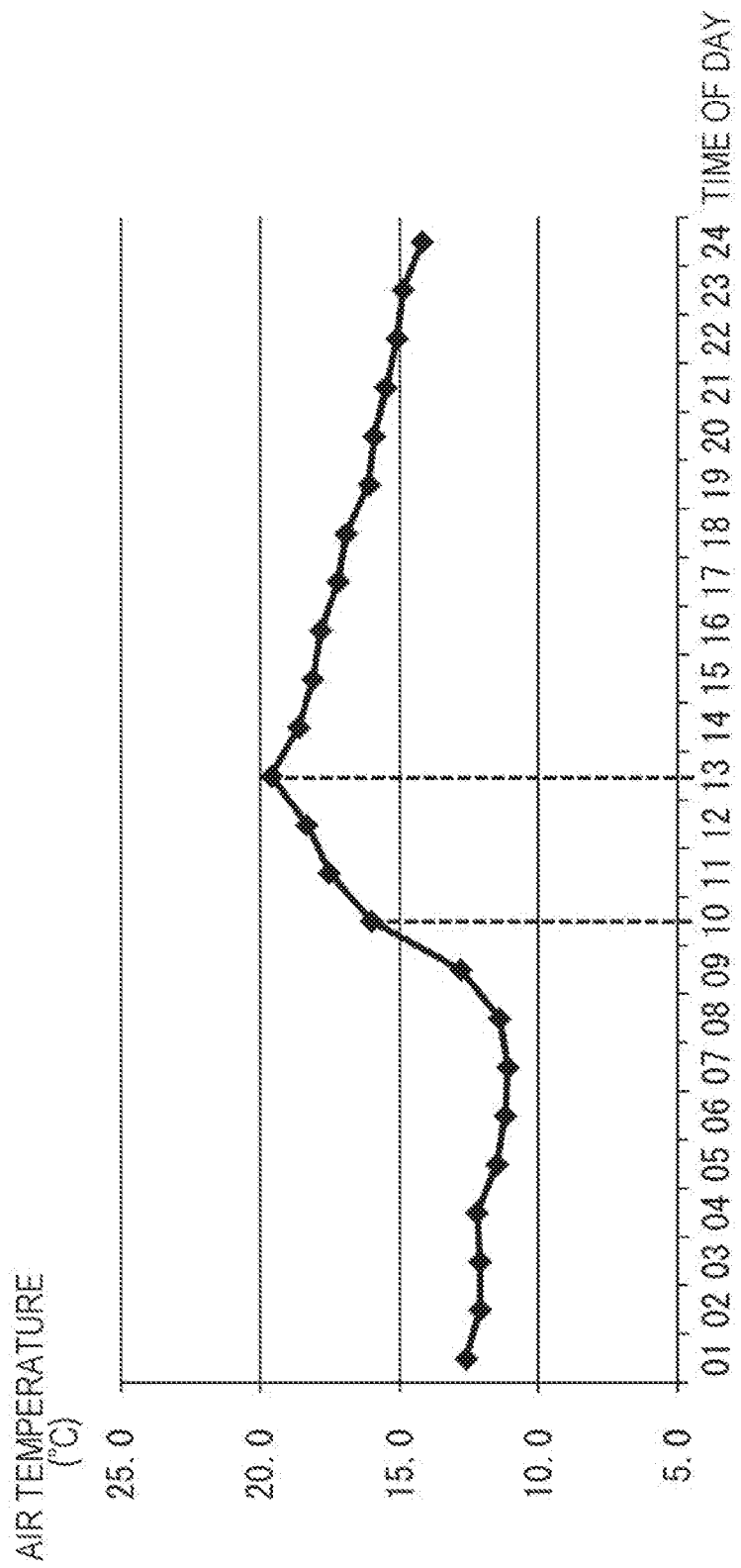

FIG. 15

| SETTING CONDITION | TEMPERATURE CONDITION | THIRD RULE |
|---|---|---|
| HEATING IS SET | WHEN AIR TEMPERATURE INCREASES RAPID BY 3°C OR MORE | HEATING LOOSENING OPERATION IS PERFORMED FROM TIME POINT BEFORE 30 MINUTES OF RAPID INCREASE TIME POINT TO END OF RAPID TEMPERATURE INCREASE PERIOD |
| COOLING IS SET | WHEN AIR TEMPERATURE DECREASE RAPID BY 3°C OR MORE | COOLING LOOSENING OPERATION IS PERFORMED FROM RAPID DECREASE TIME POINT TO AM 6:00 OF NEXT DAY |

FIG. 17

| EXECUTION TARGET | | | EXECUTION DATE | BLOCK ID | CONTROL DATA ID | CONTROL TARGET PERIOD | OPERATION TYPE | OPERATION MODE | SETTING TEMPERATURE |
|---|---|---|---|---|---|---|---|---|---|
| USER ID | TERMINAL ID | AIR CONDITIONER ID | POSTAL CODE | | | | | | |
| U123457 (MR/MISS/MRS B) | T987655 | A246811 | 012-3456 | 2018/11/28 | block01 | period01 | 2018/11/28 0:00 TO 9:30 | NORMAL OPERATION | HEATING | 24°C |
| | | | | | | period02 | 2018/11/28 9:30 TO 13:00 | LOOSENING OPERATION | HEATING | 23.5°C |
| | | | | | | period03 | 2018/11/28 13:00 TO 13:30 | NORMAL OPERATION | HEATING | 24°C |
| | | | | | block02 | period04 | 2018/11/28 13:30 TO 16:00 | LOOSENING OPERATION | HEATING | 23.5°C |
| | | | | | | period05 | 2018/11/28 16:00 TO 24:00 | NORMAL OPERATION | HEATING | 24°C |

SERVER, AIR CONDITIONING CONTROL SYSTEM, RECORDING MEDIUM, AND CONTROL METHOD

BACKGROUND

1. Field

The present disclosure relates to a server, an air conditioning control system, a control method, and a recording medium.

2. Description of the Related Art

As a technology in the related art, an air conditioner that operates automatically such that an air conditioning target space becomes a comfortable environment, and an energy-saving operation is performed with reduced power consumption without impairing comfort is known. For example, Japanese Unexamined Patent Application Publication No. 2010-65960 (published Mar. 25, 2010) discloses a man-machine device having a control function of predicting an operation schedule of the air conditioner on and after the next day and performing a schedule operation according to the prediction. For example, the man-machine device has a function of downloading and fetching weather data such as an outdoor air temperature and an outdoor humidity via the Internet in order to improve the prediction accuracy of the operation schedule.

However, the technology in the related art as described above does not consider the likelihood of an air conditioning target space in which air is conditioned by an air conditioner is susceptible to the influence of an external environment. Thus, the technology in the related art has a problem that it is not possible to realize an energy-saving automatic operation suitable for each air conditioning target space. For example, even in an area in which the weather is forecast to be sunny and the air temperature is expected to be high all day long, a house located in a place surrounded by high buildings may be less susceptible to such weather due to short daylight hours and low solar irradiance. A time duration in which the weather is likely to influence the air conditioning target space varies for each air conditioning target space, depending on directions of a window.

A configuration in which a sunlight sensor is installed on an air conditioner or the like, the solar irradiance in an air conditioning target space is measured, and the air conditioner performs an energy-saving automatic operation in accordance with the obtained solar irradiance is considered. With such a configuration, while it is possible to consider the impact of the external environment, there is a risk that the automatic operation may be executed in a hurry so as to follow the changing rate of the solar irradiance in the air conditioning target space, which changes momentarily. For example, when the solar irradiance is temporarily reduced because the sunshine momentarily reduces while the sun disappears behind clouds, the solar irradiance may be considered to be small, and thus heating may be strengthened. In addition, when the sun appears soon, the heating may be weakened. Accordingly, the control may become unstable.

According to an aspect of the disclosure, it is desirable to realize an air conditioning control system capable of executing a stable energy-saving automatic operation suitable for an air conditioning target space considering an impact of an external environment on the air conditioning target space.

SUMMARY

To address the above-described problems, according to an aspect of the disclosure, there is provided a server that communicates, via a network, with one or a plurality of air conditioners that execute either a normal operation or a loosening operation that consumes less power than the normal operation. The server includes a determination unit that determines a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by the solar radiation, a generation unit that generates operation plan information of at least designating a loosening operation period based on the heat exposure period, the loosening operation period being a time duration in which the air conditioner that performs air conditioning for the air conditioning target space is caused to execute the loosening operation, and a supply unit that supplies the operation plan information to the air conditioner via the network to cause the air conditioner to execute the loosening operation in the loosening operation period.

To address the above-described problems, according to another aspect of the disclosure, there is provided an air conditioning control system including one or a plurality of air conditioners that execute either a normal operation or a loosening operation that consumes less power than the normal operation, and a server that communicates with the air conditioner via a network. The server includes a determination unit that determines a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by the solar radiation, a generation unit that generates operation plan information of at least designating a loosening operation period based on the heat exposure period, the loosening operation period being a time duration in which the air conditioner that performs air conditioning for the air conditioning target space is caused to execute the loosening operation, and a supply unit that supplies the operation plan information to the air conditioner via the network to cause the air conditioner to execute the loosening operation in the loosening operation period. The air conditioner includes an acquisition unit that acquires the operation plan information from the server, and an operation control unit that executes the loosening operation in the loosening operation period designated in the acquired operation plan information.

To address the above-described problems, according to still another aspect of the disclosure, there is provided a control method of a server that communicates, via a network, with one or a plurality of air conditioners that execute either a normal operation or a loosening operation that consumes less power than the normal operation. The method includes determining a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by the solar radiation, generating operation plan information of at least designating a loosening operation period based on the heat exposure period, the loosening operation period being a time duration in which the air conditioner that performs air conditioning for the air conditioning target space is caused to execute the loosening operation, and supplying the operation plan information to the air conditioner via the network to cause the air conditioner to execute the loosening operation in the loosening operation period.

BRIEF DESCRIPTION OF THE DRAWINGS

FIG. 5 is a diagram illustrating a data structure of indoor solar irradiance information;

FIG. 6 is a graph illustrating environmental impact characteristics for each room (air conditioning target space);

FIG. 7 is a diagram illustrating a data structure of a characteristic database (DB below);

FIG. 8 is a diagram illustrating an example of a data structure of weather forecast information;

FIG. 9 is a graph illustrating an example of solar irradiance prediction information;

FIG. 10 is a diagram illustrating an example of a data structure of a generation rule;

FIG. 11 is a timing chart illustrating an example of various periods defined for each room in order to generate operation plan information;

FIG. 13 is a diagram illustrating an example of a data structure of an operation plan DB;

FIG. 14 is a graph illustrating an example of outdoor air temperature prediction information;

FIG. 15 is a diagram illustrating an example of a data structure of a generation rule;

FIG. 17 is a diagram illustrating an example of a data structure of an operation plan DB.

DESCRIPTION OF THE EMBODIMENTS

First Embodiment

Figure 2:
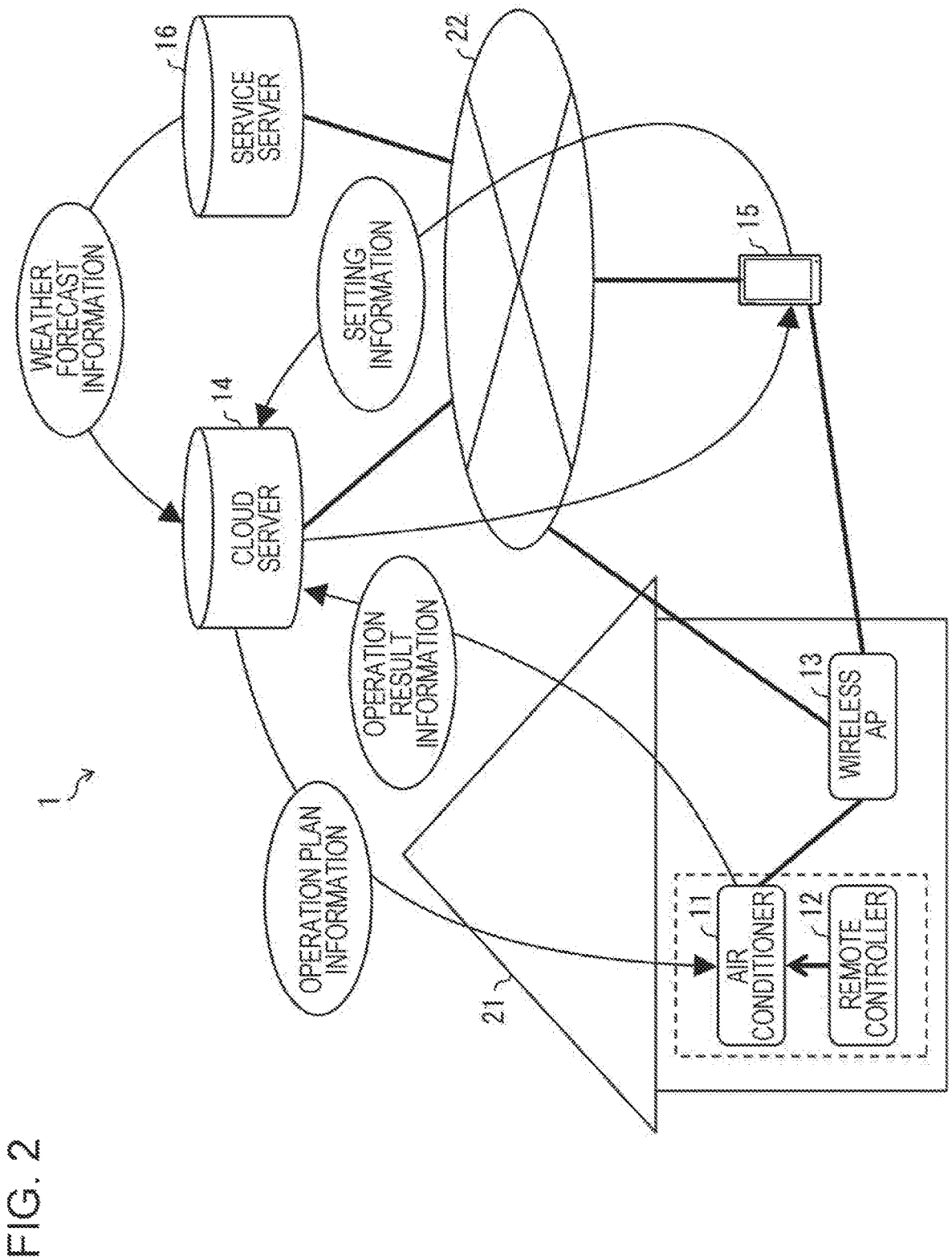
FIG. 2 is a diagram illustrating an outline of an air conditioner control system.

Hereinafter, one embodiment of the disclosure will be described in detail. An air conditioning control system in the disclosure is realized as an air conditioner control system 1 capable of remotely controlling the operation of one or a plurality of air conditioners.
System Outline FIG. 2 is a diagram illustrating an outline of the air conditioner control system 1 according to a first embodiment. As illustrated in FIG. 2, the air conditioner control system 1 includes an air conditioner 11, a remote controller 12 of the air conditioner 11, a wireless access point (AP below) 13, a cloud server (server) 14, and a portable terminal 15.

The air conditioner 11 and the wireless AP 13 are installed in a user house 21. The air conditioner 11 is connected to the cloud server 14 via the wireless AP 13 and a wide area communication network (network) 22 to enable a communication with the cloud server. The portable terminal 15 is connected to the cloud server 14 via the wide area communication network 22 to enable a communication with the cloud server. In the air conditioner control system 1, a service server 16 that provides a weather forecast service may be connected to the wide area communication network 22, and the cloud server 14 may receive the service provided by the service server 16 via the wide area communication network 22.

The cloud server 14 communicates with a plurality of air conditioners 11 in a plurality of user houses 21 via the wide area communication network 22 to control the operation of the air conditioners 11 installed in the respective user houses 21 and to collect information from the air conditioners 11.

In the first embodiment, a configuration including the Internet as the wide area communication network 22 is provided as an example. However, a telephone line network, a mobile communication network, a cable television (CATV) communication network, a satellite communication network, or the like may also be used. Both the air conditioner 11 and the portable terminal 15 are wireless communication devices, and may communicate with each other via the wireless AP 13 without passing via the wide area communication network 22.

In the first embodiment, the cloud server 14 registers the air conditioner 11 and the portable terminal 15 in association with each other. Thus, the portable terminal 15 may remotely operate the air conditioner 11 through the cloud server 14. Examples of the portable terminal 15 include smartphones and tablet terminals. One portable terminal 15 may remotely operate a plurality of air conditioners 11. A plurality of portable terminals 15 may remotely operate one air conditioner 11.

In the first embodiment, the air conditioner 11 may have only one of a cooling function and a heating function, or may have both of the operations. In the first embodiment, as an example, the air conditioner 11 is assumed to have two types of operation modes, "cooling" and "heating".

In the first embodiment, the air conditioner 11 has a function of executing a normal operation, a function of executing a loosening operation, and a function of executing an energy-saving automatic operation. In the first embodiment, the normal operation is an operation that is actively executed by an operation control unit 42 (see FIG. 3) incorporated in the air conditioner 11. In the normal operation, the operation control unit 42 controls an air-conditioner main body 33 (see FIG. 3) in accordance with a control program stored in advance in a storage unit 32 (see FIG. 3). At this time, the operation control unit 42 controls the air-conditioner main body 33 in accordance with setting information designated by the remote controller 12 or the portable terminal 15 regardless of limit in the number of rotations of a compressor 33a (see FIG. 3). The loosening operation is an operation that is executed by the operation control unit 42 actively or in accordance with an instruction from the cloud server 14. In the first embodiment, as an example, the loosening operation is an operation performed by correcting a setting temperature in a direction closer to the outdoor air temperature than a setting temperature set by a user. More specifically, in the loosening operation, for example, the number of rotations of the compressor 33a, an air-blowing fan 33b, or the like is reduced from the current number of rotations by a predetermined value, or the number of rotations is repeated to be gradually increased or decreased, such that room air temperature is changed in the direction close to the outdoor air temperature. As a result, with the loosening operation, it is possible to suppress power consumption though the room air temperature increases during cooling and decreases during heating to the extent that the comfort is not impaired.

The energy-saving automatic operation is an operation executed by the operation control unit 42 in accordance with an instruction from the cloud server 14. In the energy-saving automatic operation, the operation control unit 42 controls the air-conditioner main body 33 in accordance with operation plan information (details will be described later) supplied from the cloud server 14. The operation plan information indicates at least the control content for an instruction to perform switching between the normal operation and the loosening operation at an appropriate time. As a result, the air conditioner 11 may execute the energy-saving automatic operation in which the power consumption is suppressed in comparison to a case of executing the normal operation at all times, in accordance with the instruction from the cloud server 14, without impairing the comfort. Details of the loosening operation and the energy-saving automatic operation will be described later.

Firstly, the cloud server 14 determines the environmental impact characteristic based on operation result information transmitted from the air conditioner 11. The environmental impact characteristic indicates the susceptibility to an impact from an external environment in an air conditioning target space in which the air conditioner 11 performs air conditioning. Then, the cloud server 14 generates operation plan information based on weather forecast information acquired from the service server 16 (another device) and the environmental impact characteristics of the air conditioning target space for the air conditioner 11, and supplies the generated operation plan information to the air conditioner 11. The operation plan information is information for instructing the air conditioner 11 at what timing and how to operate in a control target period of the energy-saving automatic operation. In the first embodiment, the control target period refers to a period from a time point at which the air conditioner 11 starts the operation to a time point at which the air conditioner 11 stops the operation. A start time point and an end time point of the operation may be specified by time points at which the user operates the remote controller 12 or the portable terminal 15 to instruct the start or the end. Alternatively, the start time point and the end time point of the operation may be specified based on the setting information input for a timer function by the user with the portable terminal 15.

In the first embodiment, one or more operations of the air conditioner 11 (specifically, control contents for the air-conditioner main body 33) are defined in the control target period of the energy-saving automatic operation. Here, one piece of data that has a unit to instruct the air conditioner 11 to perform the control content in one of sub-periods obtained by dividing the control target period into some sub-periods is referred to as control data. Thus, the operation plan information is configured by a collection of one or a plurality of pieces of control data. Preferably, in the operation plan information, the plurality of pieces of control data are arranged in a state of being allowed to be distinguished in time series. As an example, the control data includes an item of designating a sub-period, an item of designating the type of operation, an item of designating an operation mode, and an item of designating the setting temperature. More specifically, the data structures of the operation plan information and the control data will be described later with reference to different drawings.

The air conditioner 11 executes the energy-saving automatic operation sequentially in accordance with the control data included in the operation plan information. The operation plan information is generated individually for each air conditioning target space by adding at least the environmental impact characteristics. Thus, the air conditioner 11 stably executes the automatic operation suitable for the air conditioning target space in accordance with the operation plan information, and thus it is possible to achieve both providing of a comfortable air environment and energy saving.

Regardless of whether the air conditioner is in operation or stopped, the air conditioner 11 periodically generates operation result information indicating the operation result, for example, about once every 15 minutes, and reports the operation result information indicating the operation result to the cloud server 14. The operation result information includes information indicating the operation mode of the air conditioner 11 including "stop", and a sensor value detected by a sensor unit 34 (see FIG. 3) of the air conditioner 11. The air conditioner 11 generates the operation result information every time the control content is switched during operation. For example, when the user operates the remote controller 12 or the portable terminal 15 as a trigger of switching the control content, the operation result information includes the content of an instruction issued to the air conditioner 11 by the user with the remote controller 12 or the portable terminal 15, as history.

The cloud server 14 determines the environmental impact characteristic of the air conditioning target space of the air conditioner 11 based on the sensor value included in the operation result information. As an example, the environmental impact characteristic includes information indicating a time duration in which the solar irradiance becomes sufficiently large as the air temperature of the air conditioning target space rises. The cloud server 14 generates the operation plan information, for example, by referring to a time duration in which the solar irradiance in a room (air conditioning target space) of a certain user house is large and a time duration which is indicated by weather forecast information of the day and in which the solar irradiance in an area around the user house is large. As an example, the cloud server 14 generates control data such that the intensity of a heating operation is loosened during a time duration when the solar irradiance increases and the air temperature of the room tends to increase.

As described above, the cloud server 14 may generate the operation plan information suitable for the air conditioning target space in consideration of the environmental impact characteristics of the air conditioning target space. Thus, the control is stable, and it is possible to achieve both providing of a comfortable air environment and energy saving.

Device Configuration

Figure 3:
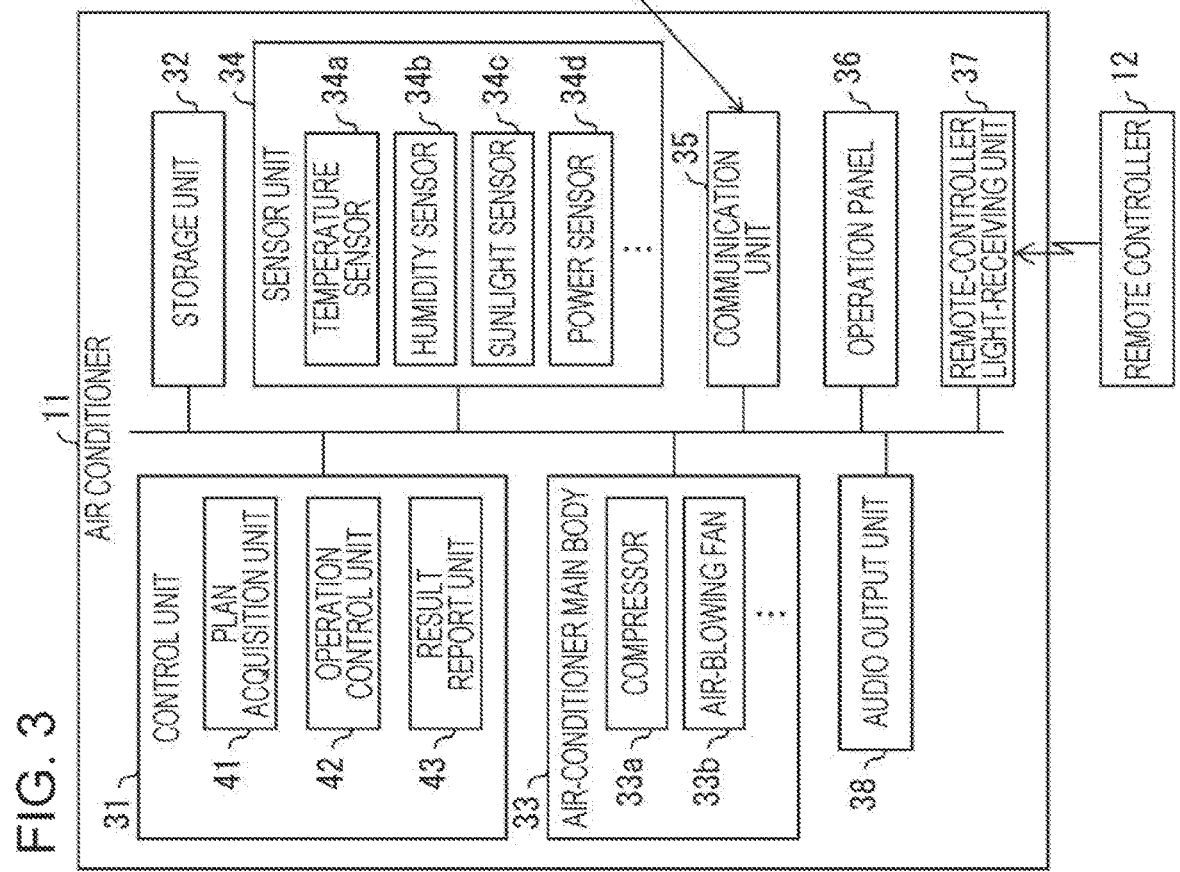
FIG. 3 is a block diagram illustrating a hardware configuration and a software configuration of each device included in the air conditioner control system.

FIG. 3 is a block diagram illustrating a hardware configuration and a software configuration of each device included in the air conditioner control system 1. The software configuration of the cloud server 14 will be described later in detail in another figure.

Hardware Configuration of Air Conditioner

As an example, the air conditioner 11 includes a control unit 31, a storage unit 32, an air-conditioner main body 33, a sensor unit 34, a communication unit 35, an operation panel 36, a remote-controller light-receiving unit 37, and an audio output unit 38.

The control unit 31 controls the operation of each unit in the air conditioner 11. The control unit 31 is formed by, for example, a computer device including an arithmetic processing unit such as a central processing unit (CPU) or a dedicated processor. The control unit 31 reads out and executes programs that are stored in the storage unit 32 and are for executing various controls in the air conditioner 11, and thereby collectively controls the operation of each unit in the air conditioner 11. The details of the control unit 31 will be described later.

The storage unit 32 stores various types of data used in the air conditioner 11, and includes a random access memory (RAM), a read only memory (ROM), a hard disk drive (HDD), and the like.

The air-conditioner main body 33 has a mechanism desired for performing the original function of the air conditioner 11. Specifically, the air-conditioner main body 33 includes a compressor 33a configured to heat or cool an air, an air-blowing fan 33b configured to blow the heated or cooled air to the outside of the air conditioner 11, and the like.

The sensor unit 34 senses the indoor environment in the user house 21 in which the air conditioner 11 performs air conditioning. Specifically, the sensor unit 34 includes a temperature sensor 34a that detects the air temperature, a humidity sensor 34b that detects the humidity, a sunlight sensor 34c that detects the solar irradiance in the room, a power sensor 34d that measures the power consumption of the air conditioner 11, and the like. Known sensors may be used as the sensors, and detailed description thereof will be omitted. The air conditioner 11 performs an air conditioning operation such as a cooling operation and a heating operation, such that the air temperature (room air temperature) in a room reaches the setting temperature. As described above, the environment sensed by the temperature sensor 34a is desired for the air conditioner 11 to control the air conditioning operation.

The communication unit 35 performs a mutual communication with the cloud server 14 and the portable terminal 15 via the wireless AP 13 and the wide area communication network 22.

The operation panel 36 is a user interface for the user to input an instruction to the air conditioner 11 and to perform a notification of the state of the air conditioner 11 (for example, operation mode, outdoor air temperature, and setting temperature).

The remote-controller light-receiving unit 37 is configured to receive an infrared signal from the remote controller 12 and to receive instruction information from the remote controller 12.

The audio output unit 38 is an audio output device such as a speaker. The control unit 31 outputs an audio based on audio data stored in the storage unit 32, from the audio output unit 38. The air conditioner 11 may include an audio input device such as a microphone in order to perform an operation by audio.

Software Configuration of Air Conditioner

As an example, the control unit 31 in the air conditioner 11 includes a plan acquisition unit (acquisition unit) 41, an operation control unit 42, and a result report unit 43. The control unit 31 may include a functional block (not illustrated) in which an air conditioner is standardly provided, in order to realize the function that is originally included in the air conditioner 11. In addition, the control unit 31 may include a setting acquisition unit, a sensor value acquisition unit, and the like (not illustrated).

The setting acquisition unit acquires the setting information set by the user with the remote controller 12. For example, as the setting information, the start time point and set time point of a normal operation, or the setting time point and the setting temperature of an energy-saving automatic operation are assumed. The setting information set by the user with the portable terminal 15 may be registered in the cloud server 14, and the setting acquisition unit may also acquire the above-described setting information from the communication unit 35.

The sensor value acquisition unit appropriately acquires sensor values detected by various sensors of the sensor unit 34. The acquired sensor value is transmitted to the cloud server 14 through the communication unit 35, or is appropriately used as a reference for determining how the operation control unit 42 controls the air-conditioner main body 33.

The plan acquisition unit 41 acquires operation plan information from the cloud server 14. The plan acquisition unit 41 may acquire the operation plan information from the cloud server 14 in a PUSH type, or may acquire the operation plan information from the cloud server 14 in a PULL type after requesting the operation plan information to the cloud server 14 as desirable. Since the operation plan information includes the control data of the air conditioner 11 over the entire control target period, in the first embodiment, the operation plan information is divided into some blocks and supplied from the cloud server 14. The plan acquisition unit 41 requests the operation plan information from the cloud server 14 such that the blocks of the operation plan information are sequentially supplied at appropriate timings in accordance with the progress of the energy-saving automatic operation.

The operation control unit 42 controls the operation of the air-conditioner main body 33 based on the operation information for various operation modes, which is stored in the storage unit 32. For example, operation information in the normal operation includes parameters for proportional integral differential (PID) control. In the energy-saving automatic operation, a combination of the normal operation and the loosening operation is executed in accordance with the operation plan information supplied from the cloud server 14. Thus, in the energy-saving automatic operation, the operation control unit 42 appropriately refers to the operation information during the normal operation and the operation information during the loosening operation.

For example, when executing the energy-saving automatic operation, the operation control unit 42 starts the operation of the air-conditioner main body 33 at the operation start time point designated in the operation plan information supplied from the cloud server 14, at the designated setting temperature in the designated operation mode. The operation control unit 42 continues the above-described operation for a time duration designated in the operation plan information or until the designated operation end time point. The operation control unit 42 performs the operation by performing switching to another designated control content at an appropriate time in accordance with the operation plan information. For example, the operation control unit 42 performs switching from the normal operation to the loosening operation, and thus limits the number of rotations of the compressor 33a to suppress the power consumption or decreases the setting temperature for heating to suppress the power consumption. Thus, the air conditioner 11 may perform switching of the strength of the operation in consideration of a time duration in which an impact of the external environment is easily received. Accordingly, it is possible to realize a stable automatic operation suitable for an air conditioning target space.

The result report unit 43 generates information regarding the air conditioner 11, in particular, operation result information and controls the communication unit 35 to transmit the generated information to the cloud server 14. The operation result information is information indicating when, how long, what type of operation the air conditioner 11 performs, or does not perform. The data structure of the operation result information will be described in detail with reference to another figure. For example, the operation result information includes information of the operation start time point, the duration, the setting temperature, the operation mode, and the air volume.

In addition, the operation result information may include a sensor value sensed by each sensor unit 34. As the sensor value, for example, the air temperature, humidity, and the solar irradiance in the air conditioning target space, the integrated power of the air conditioner 11, the number of rotations of the compressor 33a and the air-blowing fan 33b, and the like are assumed.

Hardware Configuration of Portable Terminal

As an example, the portable terminal 15 includes a control unit 51, a storage unit 52, a communication unit 53, a display unit 54, and an input unit 55.

The control unit 51 controls the operation of each unit of the portable terminal 15. The control unit 51 is formed by, for example, a computer device including an arithmetic processing unit such as a CPU or a dedicated processor. The control unit 51 reads out and executes programs that are stored in the storage unit 52 and are for executing various controls in the portable terminal 15, and thereby collectively controls the operation of each unit in the portable terminal 15. The details of the control unit 51 will be described later.

The storage unit 52 stores various types of data used in the portable terminal 15, and includes a RAM, a ROM, and the like.

The communication unit 53 performs a mutual communication with the air conditioner 11 and the cloud server 14 via the wireless AP 13 and the wide area communication network 22.

The display unit 54 is a display device that displays information processed by the control unit 51 such that the user is allowed to visually recognize the information. For example, the display unit 54 is configured by a liquid crystal display (LCD), an organic electro-luminescence (EL) display, or the like.

The input unit 55 is an input device that receives an input operation of the user and outputs an instruction signal corresponding to the input operation to the control unit 51. As an example, the display unit 54 and the input unit 55 are a touch panel. The input unit 55 is configured by a device capable of detecting that an indicator such as the finger of the user touches or approaches the input surface of the input unit 55, which is also the display surface of the display unit 54.

Software Configuration of Portable Terminal

As an example, the control unit 51 in the portable terminal 15 includes a remote control unit 61 and a setting unit 62. Each unit of the control unit 51 is constructed by, for example, a dedicated application downloaded to the portable terminal 15.

The control unit 51 may include a functional block (not illustrated) in which the portable terminal (for example, a smartphone) is standardly provided, in order to realize the function that is originally included in the portable terminal 15.

The remote control unit 61 provides a tool for a user to remotely operate the air conditioner 11. The remote control unit 61 causes the display unit 54 to display an operation screen including, for example, software buttons for operating the air conditioner 11. The remote control unit 61 causes the input unit 55 to receive an input operation performed on the operation screen and transmits an instruction signal corresponding to the received input operation to the air conditioner 11 via the wireless AP 13.

The setting unit 62 provides an input support tool for the user to input setting information. The setting unit 62 generates setting information in accordance with an input operation of the user and transmits the generated setting information to at least one of the air conditioner 11 and the cloud server 14. The setting unit 62 causes the display unit 54 to display a setting screen including, for example, a user interface (UI) component (widget) for inputting the setting information. The setting unit 62 causes the input unit 55 to receive an input operation performed on the setting screen. The setting unit 62 generates the setting information based on the received instruction signal corresponding to the above-described input operation, and transmits the generated setting information to the air conditioner 11 via the wireless AP 13 or to the cloud server 14 via the wide area communication network 22. In the first embodiment, the setting unit 62 generates, for example, setting information related to the energy-saving automatic operation, and transmits the generated setting information to the cloud server 14 via the wide area communication network 22.

Hardware Configuration of Cloud Server

As an example, the cloud server 14 includes a control unit 71, a storage unit 72, and a communication unit 73.

The control unit 71 controls the operation of each unit of the cloud server 14. The control unit 71 is formed by, for example, a computer device including an arithmetic processing unit such as a CPU or a dedicated processor. The control unit 71 reads out and executes programs that are stored in the storage unit 72 and are for executing various controls in the cloud server 14, and thereby collectively controls the operation of each unit in the cloud server 14. The details of the control unit 71 will be described later with reference to FIG. 1.

The storage unit 72 stores various types of data used in the cloud server 14, and includes a RAM, a ROM, an HDD, and the like.

The communication unit 73 performs a mutual communication with the air conditioner 11 and the portable terminal 15 via the wide area communication network 22 and, if desirable, the wireless AP 13.

Software Configuration of Cloud Server

Figure 1:
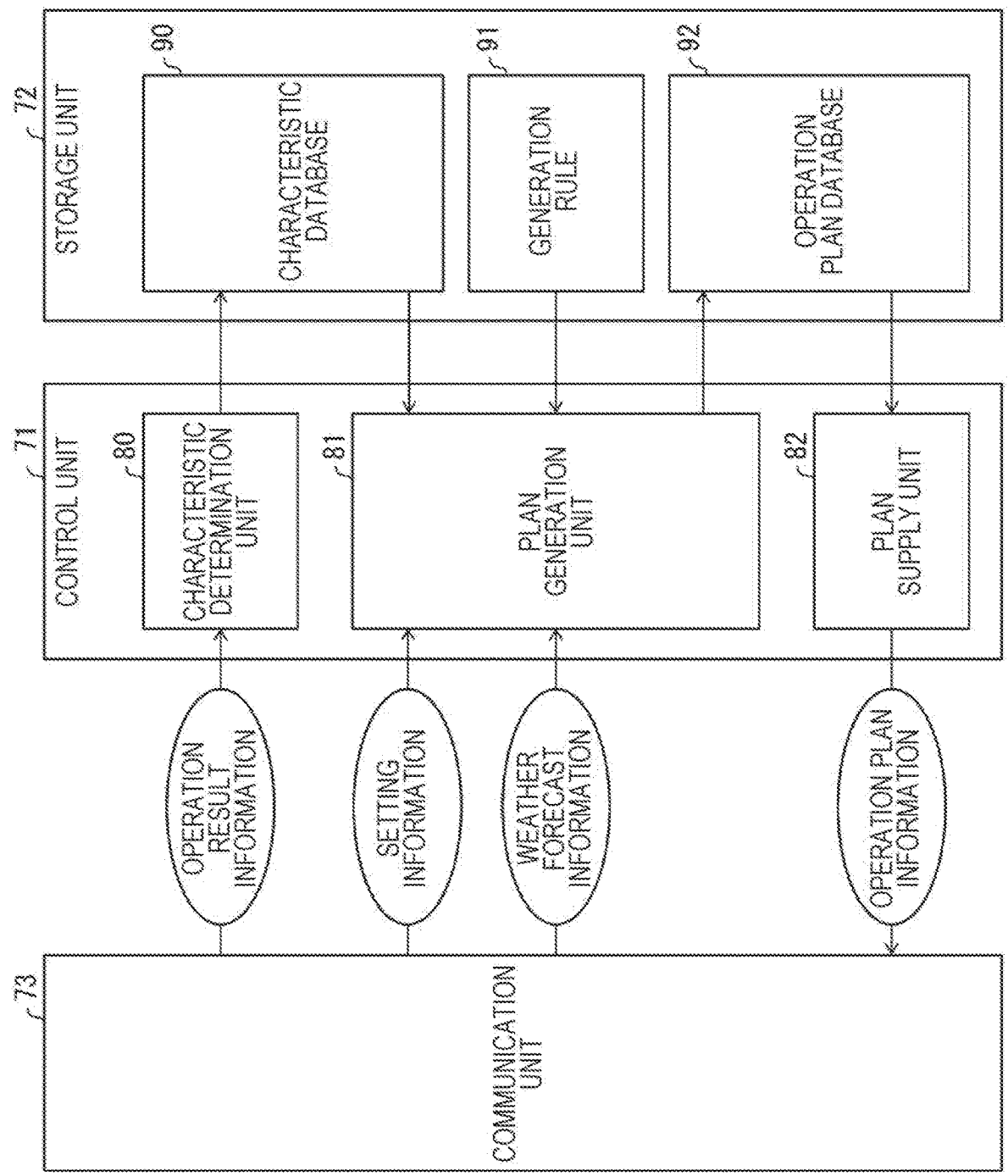
FIG. 1 is a block diagram illustrating a main configuration of a cloud server.

FIG. 1 is a block diagram illustrating a main configuration of the cloud server 14. As an example, the control unit 71 includes a characteristic determination unit (determination unit) 80, a plan generation unit (generation unit) 81, and a plan supply unit (supply unit) 82.

As an example, the storage unit 72 stores a characteristic database (DB below) 90, a generation rule 91, and an operation plan database (DB below) 92.

The characteristic determination unit 80 determines the environmental impact characteristic of the air conditioning target space which is the target for the air conditioner 11 to perform conditioning of the air. The air conditioning target space is, for example, one room in which the air conditioner 11 is installed in the user house 21. The environmental impact characteristic refers to information indicating the susceptibility to the impact from an external environment in the air conditioning target space. As an example, the environmental impact characteristic indicates a time duration in which the environment in the air conditioning target space is easily influenced by solar radiation. Specifically, in the first embodiment, the environmental impact characteristic is configured to include at least a heat exposure period of the air conditioning target space (for example, room in the user house 21) in which the air conditioner 11 is installed.

The heat exposure period refers to information indicating a time duration in which sunshine with the solar irradiance as sufficient as the indoor air temperature may rise is incident into the room in one day. The heat exposure period varies for each room by various factors, for example, a direction in which equipment that transmits sunlight such as a glass windows is installed, a material used for forming the equipment, an object that blocks the sunlight and is provided around the room. For example, it is considered that, in a room in which a window is installed in the east, the heat exposure period is concentrated in the morning, and, in a room in which the window is installed in the west is concentrated in the evening.

The characteristic determination unit 80 acquires, from the air conditioner 11, operation result information including the sensor value acquired by the sunlight sensor 34c of the air conditioner 11 installed in the room. The characteristic determination unit 80 specifies the heat exposure period of the room based on the sensor value, that is, the one-day transition of the solar irradiance measured in the room. The characteristic determination unit 80 generates the environmental impact characteristic including the heat exposure period, and registers the generated environmental impact characteristic in the characteristic DB 90.

The plan generation unit 81 generates the operation plan information. In the first embodiment, as an example, the plan generation unit 81 generates the operation plan information based on the setting information transmitted from the portable terminal 15 and the weather forecast information acquired from the service server 16, in accordance with the generation rule 91. The plan generation unit 81 stores the operation plan information in the operation plan DB 92 in such a manner that the room and date and time of the energy-saving automatic operation can be distinguished.

The plan supply unit 82 reads out the operation plan information generated by the plan generation unit 81 from the operation plan DB 92 and supplies the operation plan information to the air conditioner 11. In the first embodiment, as an example, the plan supply unit 82 supplies the operation plan information after the next day, which is created in advance in the operation plan DB 92, to the air conditioner 11 in advance before 0:00 on a day when the energy-saving automatic operation is scheduled to be performed based on the operation plan information. In another embodiment, as an example, the plan supply unit 82 supplies the operation plan information divided into a plurality of blocks such that the leading block and the next block are in time for the start date of the energy-saving automatic operation. Then, the plan supply unit 82 sequentially supplies the next blocks after the next time and the subsequent blocks, in response to a request from the air conditioner 11 or in time for the start time point of the operation based on the blocks.

Processing Flow

Figure 4:
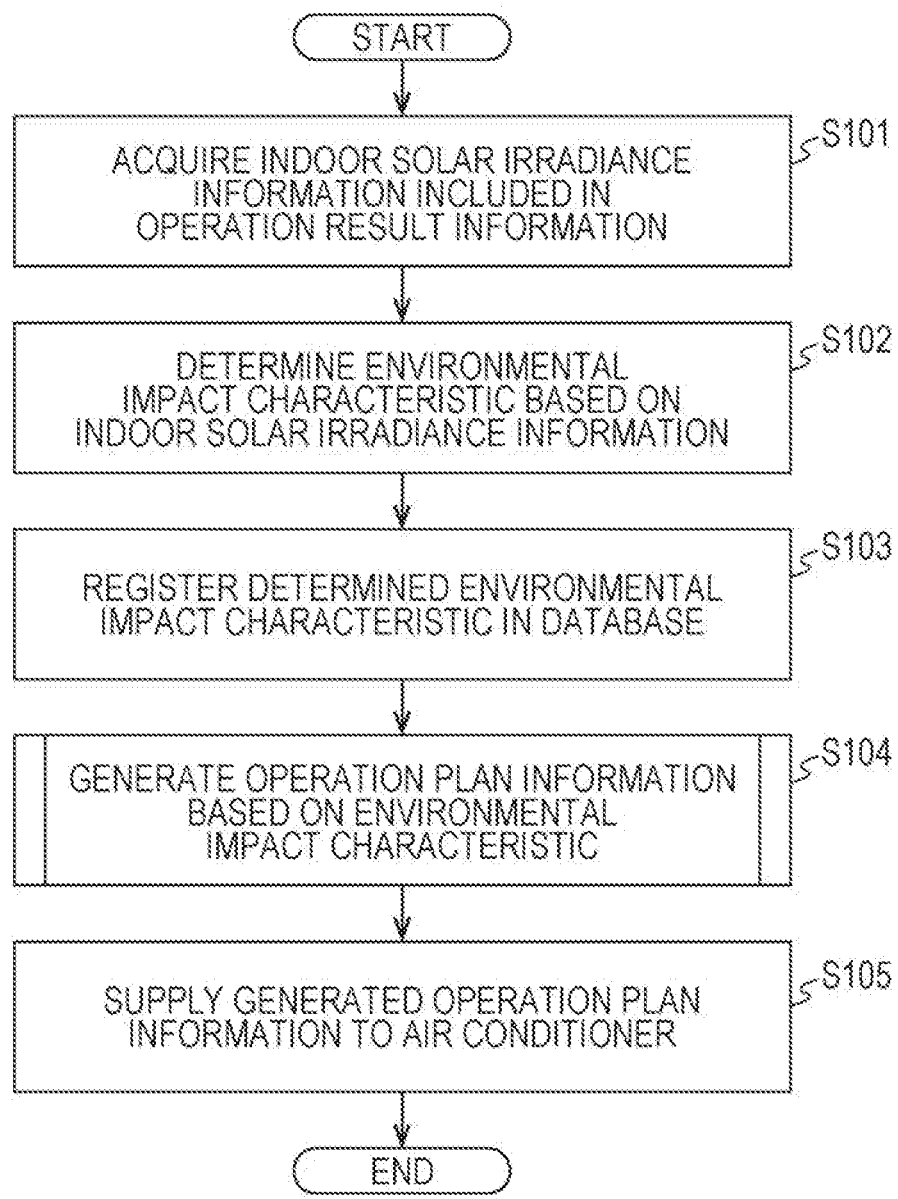
FIG. 4 is a flowchart illustrating a flow of processing executed by the cloud server.

FIG. 4 is a flowchart illustrating the flow of processing executed by the cloud server 14.

In Step S101, the characteristic determination unit 80 acquires the indoor solar irradiance information included in the operation result information in the past, for example, of the previous day in a certain air conditioning target space. The indoor solar irradiance information is information indicating the transition of the solar irradiance measured in the air conditioning target space.

In Step S102 (determination step), the characteristic determination unit 80 determines the environmental impact characteristic of the air conditioning target space based on the acquired indoor solar irradiance information.

In Step S103, the characteristic determination unit 80 associates the determined environmental impact characteristic with identification information for uniquely identifying the air conditioning target space and registers the resultant of the association in the characteristic DB 90. The identification information includes, for example, a user ID for identifying the user who is the owner of the air conditioning target space, an air conditioner ID for identifying the air conditioner 11 installed in the air conditioning target space, and a terminal ID for identifying the portable terminal 15 of the user.

In Step S104 (generation step), the plan generation unit 81 generates the operation plan information based on the environmental impact characteristic of the air conditioning target space, which is registered in the characteristic DB 90. As an example, the plan generation unit 81 generates the operation plan information based on the setting information transmitted from the portable terminal 15, the weather forecast information in the future, for example, on the next day, and the environmental impact characteristic. The flow of processing of generating the operation plan information will be described later in detail with reference to another drawing.

In Step S105 (supply step), the plan supply unit 82 supplies the generated operation plan information to the air conditioner 11 installed to condition the air in the air conditioning target space, at an appropriate timing.

The data structure of the information processed by each unit of the control unit 71 will be specifically described below, and the function of each unit will be described below in detail.

Data Structure

Indoor Solar Irradiance Information

FIG. 5 is a diagram illustrating the data structure of the indoor solar irradiance information. The indoor solar irradiance information is included in the operation result information transmitted from the air conditioner 11. The operation result information is configured by a set of a plurality of result records. The result record is generated by the result report unit 43 of the air conditioner 11 triggered by a predetermined event that occurred during the control target period of the air conditioner 11. One result record is generated for each event. For example, the result report unit 43 creates a result record at a time point triggered by a trigger event that occurs every 15 minutes, regardless of whether the air conditioner 11 is operating or stopping. The result record is configured by items such as the operation mode of the air conditioner 11, the setting temperature, the air flow rate, the wind direction, the indoor air temperature, the indoor humidity, the indoor solar irradiance, and the integrated electric energy at a time point when the trigger event occurs. The integrated electric energy is obtained by integration for a certain period. For example, the integrated power may be the integrated power in a period from the last measurement timing (15 minutes before) to the above-described time point when the trigger event occurs. The result report unit 43 generates a result record configured by the above-described items measured at a time point, triggered by a change event in which the content of the operation is changed by the user through the remote controller 12 or the portable terminal 15. For example, the result report unit 43 may collectively report the result records for a certain day to the cloud server 14 as the operation result information, or may sequentially report a result record to the cloud server 14 every time the result record is generated. Although FIG. 5 illustrates only the item of the indoor solar irradiance in the operation result information on 2018 Nov. 26, the operation result information also includes the above-described items (not illustrated).

The characteristic determination unit 80 collects the indoor solar irradiance information indicating the transition of the solar irradiance for one day, for each room and each day, as illustrated in FIG. 5, and stores the indoor solar irradiance information in the storage unit 72. The characteristic determination unit 80 determines the environmental impact characteristic of each room, based on the accumulated pieces of the indoor solar irradiance information.

The characteristic determination unit 80 may determine the environmental impact characteristic of each room based on the indoor solar irradiance information of the previous day, or may determine the environmental impact characteristic of each room based on an average of pieces of the indoor solar irradiance information for the several days in the past. For example, in the first embodiment, the characteristic determination unit 80 determines the environmental impact characteristic of each room based on the average of pieces of the indoor solar irradiance information for one month in the past. Further, the characteristic determination unit 80 determines the environmental impact characteristic of each room based on the average of pieces of the indoor solar irradiance information for each group obtained by dividing pieces of the indoor solar irradiance information for one month in the past by weather. Specifically, the characteristic determination unit 80 determines the environmental impact characteristic on a sunny day, the environmental impact characteristic on a cloudy day, and the environmental impact characteristic on a rainy day for each room.

Extraction of Environmental Impact Characteristic

FIG. 6 is a graph illustrating the environmental impact characteristic of each room (air conditioning target space) that is located in the same area, but has different sunshine conditions. In particular, the graph indicates the average value of indoor solar irradiance information. A vertical axis of the graph indicates the indoor solar irradiance measured by the sunlight sensor 34c of the air conditioner 11. A horizontal axis indicates the time of day when the indoor solar irradiance is measured. Specifically, each graph indicates the average value of indoor solar irradiance information on sunny days for one month in the past. The graphs illustrated in FIG. 6 are illustrated for the purpose of facilitating the understanding of the disclosure such that the graphs are visually easily understood. Thus, the characteristic determination unit 80 may omit the step of creating the illustrated graphs based on the indoor solar irradiance information of each room.

The graph 181 in FIG. 6 indicates the average value of the indoor solar irradiance information of a room of a user (Mr/Miss/Mrs. A). With the graph 181, it is possible to estimate that the room of Mr/Miss/Mrs. A has a window provided to face the east. The graph 182 indicates the average value of the indoor solar irradiance information of a room of a user (Mr/Miss/Mrs. B). With the graph 182, it is possible to estimate that the room of Mr/Miss/Mrs. B has a window provided to face the west. The graph 183 indicates the average value of the indoor solar irradiance information of a room of a user (Mr/Miss/Mrs. C). With the graph 183, it is possible to estimate that the room of Mr/Miss/Mrs. C has a window provided for the north or there is an object that blocks sunlight in a direction of the window facing the south.

The characteristic determination unit 80 determines the environmental impact characteristic of the room of each user on a sunny day from the average value of the indoor solar irradiance information based on a predetermined indoor solar irradiance threshold value. The indoor solar irradiance threshold value is a threshold value for determining whether or not the indoor solar irradiance is sufficient to cause an increase in indoor air temperature. In the first embodiment, the indoor solar irradiance threshold value is used as a reference by the characteristic determination unit 80 in order to specify the heat exposure period of the room.

The characteristic determination unit 80 compares each indoor solar irradiance every one hour to the indoor solar irradiance threshold value, and specifies the time duration in which the indoor solar irradiance equal to or more than the indoor solar irradiance threshold value is observed, as the heat exposure period. For example, the characteristic determination unit 80 specifies the heat exposure period of the room of Mr/Miss/Mrs. A to be 6:00 to 12:00, specifies the heat exposure period of the room of Mr/Miss/Mrs. B to be 14:00 to 16:00, and specifies the heat exposure period of the room of Mr/Miss/Mrs. C to be "none". The characteristic determination unit 80 registers, in the characteristic DB 90, the environmental impact characteristics which is specified for each room and weather and includes the heat exposure period.

Characteristic Database

FIG. 7 is a diagram illustrating the data structure of the characteristic DB. As an example, the characteristic DB 90 includes items of the control target information and the environmental impact characteristics.

Identification information for uniquely identifying the air conditioning target space of the air conditioner 11 is stored in the item of the control target information. The control target information includes, for example, at least one of a user ID, a terminal ID, and an air conditioner ID. Further, the address or the postal code of the user house 21 may be included as the control target information.

The environmental impact characteristic of the air conditioning target space is stored in the item of the environmental impact characteristic. As an example, the item of the environmental impact characteristic may include sub-items of the extraction period, the weather, and the heat exposure period. Information indicating a period during which the indoor solar irradiance information is extracted is stored in the sub-item of the extraction period. The group name of weather for grouping pieces of the indoor solar irradiance information for each day is stored in the sub-item of the weather. Information indicating the heat exposure period specified by the characteristic determination unit 80 based on the indoor solar irradiance threshold value is stored in the heat exposure period.

The plan generation unit 81 may read out the environmental impact characteristic determined for each room and each weather, as desirable, by accessing the characteristic DB 90 having the above-described data structure.

Setting Information

The setting information refers to information for the user to instruct the air conditioner 11 to execute the energy-saving automatic operation by the air conditioner 11. As an example, the setting information includes items of a flag, the operation mode, and the setting temperature.

A flag indicating whether or not the function of the energy-saving automatic operation performed under the initiative of the cloud server 14 is set to be valid is stored in the item of the flag. Information for designating cooling or heating is stored in the item of the operation mode. A numerical value indicating the indoor air temperature desired by the user is stored in the item of the setting temperature.

If the setting unit 62 of the portable terminal 15 receives various settings from the user through the above-described setting screen, the setting unit 62 generates setting information including the items of the flag, the operation mode, and the setting temperature. Then, the setting unit transmits the generated setting information to the cloud server 14.

Weather Forecast Information

FIG. 8 is a diagram illustrating an example of the data structure of the weather forecast information. In the first embodiment, the plan generation unit 81 determines when to loosen the operation of the air conditioner 11 based on the predicted value of the solar irradiance. The cloud server 14 acquires, from the service server 16, the weather forecast information including the predicted value of the solar irradiance desired to determine a period in which the operation is loosened.

For example, when the plan generation unit 81 generates the plan operation information of the air conditioner 11 of the user house 21, the plan generation unit 81 acquires the weather forecast information of the desired area from the service server 16 based on place information registered in advance for the place of the user house 21. As the place information, a postal code, latitude and longitude information, an address, and the like are assumed. In another example, the cloud server 14 may periodically acquire the latest weather forecast information of the entirety of Japan and store the acquired weather forecast information in the storage unit 72 for each area. In this case, the plan generation unit 81 reads out the weather forecast information of the desired area from the storage unit 72.

As an example, the weather forecast information includes items such as the place, the issuing date and time, the date, the time of day, the weather, the air temperature, the humidity, and the solar irradiance. It is assumed that, among the items, the predicted values of the weather, the air temperature, the humidity, and the solar irradiance are calculated and issued every hour, as an example.

In the item of the place, the place information indicating which region the corresponding predicted value belongs to is stored. The place information is, for example, a postal code, latitude and longitude information, or an address.

Information indicating when the corresponding predicted value is issued by the service server 16 is stored in the item of the issuing date and time. The plan generation unit 81 preferentially refers to the latest issuing date and time, and generates the control data. When there is control data generated based on the old weather forecast information, the plan generation unit 81 may correct the control data as desirable based on the latest weather forecast information.

The date indicating which predicted value is the corresponding predicted value is stored in the item of the date. A time of day indicating which time duration of the predicted value is the above-described predicted value is stored in the item of the time of day.

Weather expected at the corresponding date and time is stored in the item of the weather. For example, sunny, cloudy, or rain are stored. An air temperature expected at the corresponding date and time is stored in the item of the air temperature. Humidity expected at the corresponding date and time is stored in the item of the humidity.

An integrated value of the solar irradiance expected to be observed in the corresponding time duration is stored in the item of the solar irradiance. For example, the predicted value of the integrated value of the solar irradiance for one hour from 0:00 to 1:00 on the corresponding day is stored in the item of the solar irradiance associated with the time of day "01".

The plan generation unit 81 generates the operation plan information of each room by using the solar irradiance prediction information (predicted value of the solar irradiance) that is included in the weather forecast information and indicates the daily transition of the solar irradiance.

FIG. 9 is a graph illustrating an example of the solar irradiance prediction information included in the weather forecast information of a certain area. A vertical axis of the graph indicates the integrated value of the solar irradiance per hour, that is predicted to be observed in the above area. A horizontal axis indicates a time of day when the integrated value of the solar irradiance is predicted to be observed.

The plan generation unit 81 refers to the solar irradiance prediction information for each day and for each region, and specifies the warmth period in the region for that day. In the first embodiment, the warmth period refers to a time duration in which it is predicted that the sufficient solar irradiance as large as can influence indoor environmental changes (for example, room air temperature rise) will be observed. The total solar irradiance threshold value for determining whether the solar irradiance is sufficient to influence the indoor air temperature rise is appropriately determined in accordance with the season, the regional climate, the regional topography, the general heat insulation performance of a house in the region, and the like. In the first embodiment, the total solar irradiance threshold value is set to 0.2 MJ/square meter. Thus, in the example illustrated in FIG. 9, the plan generation unit 81 specifies, as the warmth period, a time duration in which it is predicted that the total solar irradiance of 0.2 MJ/square meter or more per hour is observed. In the example illustrated in FIG. 9, the plan generation unit 81 specifies the warmth period of the corresponding area on the corresponding day to be 7:00 to 18:00.

Generation Rule

FIG. 10 is a diagram illustrating an example of the data structure of the generation rule. In the first embodiment, as an example, the generation rule 91 includes a period definition lookup table (LUT below) 191, and an air temperature control LUT 192.

The period definition LUT 191 is referred to by the plan generation unit 81, and is used when the plan generation unit 81 determines a period (loosening operation period below) in which the loosening operation is applied to the operation of the air conditioner 11. As an example, the period definition LUT 191 includes items of a setting condition, a solar irradiance condition, and a first rule.

A condition of whether the operation mode designated by the user is heating or cooling is stored in the item of the setting condition. When the operation mode is set to be heating, the plan generation unit 81 refers to the first or second result in the period definition LUT 191. When the operation mode is set to be cooling, the plan generation unit 81 refers to the third result.

Conditions related to the solar irradiance prediction information in the area in which the user house 21 is located and to the environmental impact characteristic of the room in which the air conditioner 11 is installed in the user house 21 are stored in the item of the solar irradiance. Specifically, conditions of whether or not the warmth period for a day in the area is specified and whether or not the heat exposure period in the room is specified based on the solar irradiance prediction information of the day (for example, the next day) on which the energy-saving automatic operation is executed based on the operation plan information are stored.

A rule of the operation plan information to be generated by the plan generation unit 81 in accordance with the above setting condition and solar irradiance condition is stored in the item of the first rule. Specifically, a rule of defining whether or not to perform the loosening operation and a period for performing the loosening operation is stored in the item of the first rule.

The air temperature control LUT 192 is referred to by the plan generation unit 81, and is used when the plan generation unit 81 determines the item of the control data to be processed by the air conditioner 11 for each of the heating loosening operation period and the normal operation period. As an example, the air temperature control LUT 192 includes items of a control target period and a second rule.

The type of a sub-period classified by the plan generation unit 81 in accordance with the period definition LUT 191 is stored in the item of the control target period. In the first embodiment, as an example, the plan generation unit 81 classifies the sub-period within the control target period into one of the following four types. That is, the four types are a sub-period (heating normal operation period) during which the normal operation is performed by heating, a sub-period (heating loosening operation period) during which heating is loosened, and a sub-period (cooling normal operation) during which the normal operation is performed by cooling, and a sub-period (cooling loosening operation period) during which the cooling operation is loosened.

A rule of defining the control content to be executed on the air-conditioner main body 33 by the air conditioner 11 for each type of sub-period is stored in the item of the second rule. For example, the loosening operation by heating is defined as operating by setting the "setting temperature" to "(the setting temperature designated by the user)−0.5° C.".

By referring to the LUT described above, the plan generation unit 81 may define the loosening operation period in the control target period of the energy-saving automatic operation on a certain day in a certain room, and may generate the operation plan information in which the specific manner of the control in the loosening operation period is defined. Since such operation plan information is supplied to the air conditioner 11, the air conditioner 11 may execute an operation of loosening the setting temperature in a period in which room air temperature tends to increase due to the benefit of sunlight, or a period in which the room air temperature tends to decrease due to darkness. As a result, it is possible to execute the energy-saving automatic operation in which power consumption of the air conditioner 11 is suppressed, without impairing the comfort of the indoor environment, by a stable control.

FIG. 11 is a timing chart illustrating an example of various periods defined for each room in order for the cloud server 14 to generate operation plan information for the next day in a certain area.

In FIG. 11, the warmth period specified by the plan generation unit 81 based on solar irradiance prediction information of the next day in the above-described area is illustrated on the top row. In the example illustrated in FIG. 11, the warmth period is 7:00 to 18:00.

The second row from the top indicates various periods determined for the room of Mr/Miss/Mrs. A living in the above area. In the first embodiment, the plan generation unit 81 reads out the environmental impact characteristic when the weather is fine in the room of Mr/Miss/Mrs. A from the characteristic DB 90 based on a point that the weather forecast of the next day is "fine", and thus acquires the heat exposure period. In the example illustrated in FIG. 11, the heat exposure period of the room of Mr/Miss/Mrs. A is 6:00 to 12:00.

The third row from the top indicates various periods determined for the room of Mr/Miss/Mrs. B living in the same area. The plan generation unit 81 reads out the environmental impact characteristic when the weather is fine in the room of Mr/Miss/Mrs. B from the characteristic DB 90, and acquires the heat exposure period. In the example illustrated in FIG. 11, the heat exposure period of the room of Mr/Miss/Mrs. B is 14:00 to 16:00.

The bottom row indicates various periods determined for the room of Mr/Miss/Mrs. C living in the same area. The plan generation unit 81 reads out the environmental impact characteristic when the weather is fine in the room of Mr/Miss/Mrs. C from the characteristic DB 90, and acquires the heat exposure period. In the example illustrated in FIG. 11, the heat exposure period of the room of Mr/Miss/Mrs. C is not specified.

Regarding a specific example of the room of Mr/Miss/Mrs. A illustrated in FIG. 11, a flow of processing of generating the operation plan information will be described below with reference to FIG. 12. Here, it is assumed that the setting information of Mr/Miss/Mrs. A is transmitted from the portable terminal 15 and stored in the storage unit 72 of the cloud server 14 in advance. It is assumed that, in the setting information of Mr/Miss/Mrs. A, the energy-saving automatic operation is set to be valid, the operation mode is set to be heating, and the setting temperature is set to 22° C.

Flow of Processing of Generating Operation Plan Information

Figure 12:
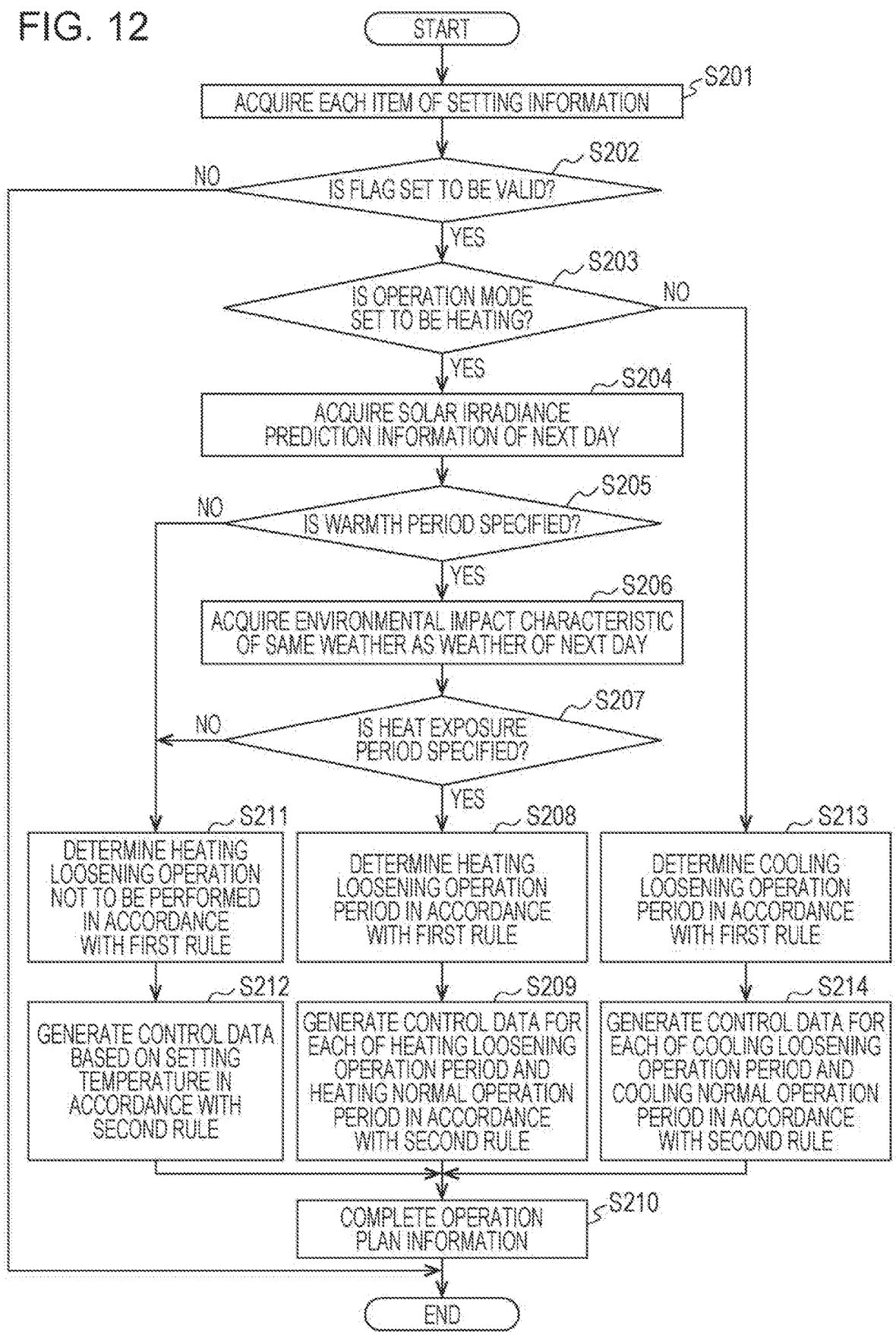
FIG. 12 is a flowchart illustrating a flow of processing in which a plan generation unit generates the operation plan information.

FIG. 12 is a flowchart illustrating the flow of the processing in which the plan generation unit 81 generates the operation plan information.

In Step S201, the plan generation unit 81 acquires each item of the setting information set by the user from the storage unit 72.

In Step S202, the plan generation unit 81 determines whether or not the flag included in the setting information indicates that the energy-saving automatic operation is valid. When the flag indicates invalidity, the plan generation unit 81 proceeds to NO in S202 and ends the series of processes. When the flag indicates validity, the plan generation unit 81 proceeds from YES in S202 to S203, and reads out the period definition LUT 191 from the generation rule 91.

In Step S203, the plan generation unit 81 determines whether the operation mode included in the setting information indicates heating or cooling. When the operation mode is set to be heating, the plan generation unit 81 proceeds from YES in S203 to S204, in accordance with the period definition LUT 191. When the operation mode is set to be cooling, the plan generation unit 81 proceeds from NO in S203 to S213.

In Step S204, the plan generation unit 81 acquires the weather forecast information of the next day of the area including the user house 21 of Mr/Miss/Mrs. A, from the storage unit 72 or the service server 16. Then, the plan generation unit 81 reads out the solar irradiance prediction information included in the weather forecast information.

In Step S205, the plan generation unit 81 specifies the warmth period from the read solar irradiance prediction information based on a predetermined total solar irradiance threshold value. The plan generation unit 81 determines whether or not specifying the warmth period from the read solar irradiance prediction information is possible. In accordance with the period definition LUT 191, the plan generation unit 81 proceeds from YES in S205 to S206 when specifying the warmth period is possible. When specifying the warmth period is not possible, the plan generation unit 81 proceeds from NO in S205 to S211.

In Step S206, the plan generation unit 81 acquires the environmental impact characteristic of the room of Mr/Miss/Mrs. A from the characteristic DB 90. As an example, when it is predicted that the weather of the next day in the area is fine by the weather forecast information of the next day acquired in S204, the plan generation unit 81 reads out the environmental impact characteristic when the weather is fine in the room of Mr/Miss/Mrs. A, from the characteristic DB 90.

In Step S207, the plan generation unit 81 determines whether or not the heat exposure period is specified in the read environmental impact characteristic. The plan generation unit 81 proceeds from YES in S207 to S208 when the heat exposure period is specified, in accordance with the period definition LUT 191. The plan generation unit 81 proceeds to S211 from NO of S207 when the heat exposure period is not specified.

In Step S208, the plan generation unit 81 determines a heating loosening operation period in accordance with the first rule. Here, the plan generation unit 81 performs the determination in accordance with the first rule indicated in the first row of the period definition LUT 191 based on a point that heating is set, a point that specifying the warmth period of the next day in the area is possible and a point that the heat exposure period of the room of Mr/Miss/Mrs. A is specified.

Specifically, firstly, the plan generation unit 81 specifies an overlap period being a time duration in which the warmth period overlaps the heat exposure period. In the example illustrated in FIG. 11, the plan generation unit 81 specifies the overlap period as 7:00 to 12:00. Then, the plan generation unit 81 determines the time duration including the specified overlap period, as a heating loosening operation period. As an example, the plan generation unit 81 determines the heating loosening operation period to be a time duration from a time point before a predetermined time (for example, 30 minutes before) from the start time point of the overlap period in accordance with the first rule. Specifically, the plan generation unit 81 determines the heating loosening operation period of the next day in the room of Mr/Miss/Mrs. A to be 6:30 to 12:00.

In Step S209, the plan generation unit 81 generates control data for each sub-period obtained by classifying the control target period, in accordance with the air temperature control LUT 192. In the above-described example, the plan generation unit 81 classifies 6:30 to 12:00 in the control target period to from 0:00 to 24:00 on the next day, as the heating loosening operation period. The plan generation unit 81 classifies other periods as the heating normal operation period. Thus, the plan generation unit 81 generates first control data such that the heating normal operation is executed for a first sub-period 0:00 to 6:30 of the next day. The plan generation unit 81 generates second control data such that the heating loosening operation is executed for a second sub-period 6:30 to 12:00. The plan generation unit 81 generates third control data such that the heating normal operation is executed for a third sub-period 12:00 to 24:00.

The plan generation unit 81 generates the first control data and the third control data in accordance with the air temperature control LUT 192 such that the air-conditioner main body 33 is controlled up to the setting temperature set by the user in the heating normal operation period being the first sub-period and the third sub-period. The plan generation unit 81 corrects the setting temperature to "(installation air temperature)−0.5° C." in the heating loosening operation period of the second sub-period, in accordance with the air temperature control LUT 192. The plan generation unit 81 generates the second control data such that the air-conditioner main body 33 is controlled based on the corrected setting temperature.

In Step S210, the plan generation unit 81 completes the operation plan information. Specifically, the plan generation unit 81 arranges the control data generated in S209 in the processing order and packages the control data. In the above-described example, the plan generation unit 81 combines the first control data, the second control data, and the third control data into one operation plan information such that the air conditioner 11 may determine that the first control data, the second control data, and the third control data are processed in this order. Finally, the plan generation unit 81 associates the identification information for identifying the air conditioning target space as the control target of the energy-saving automatic operation, and the execution date of the energy-saving automatic operation, with the operation plan information. Then, the plan generation unit 81 registers the resultant of the association in the operation plan DB 92. Thus, the plan supply unit 82 may read the operation plan information for the execution of the next day, which is generated to correspond to the room of Mr/Miss/Mrs. A, from the operation plan DB 92 and supply the operation plan information to the air conditioner 11 in the room of Mr/Miss/Mrs. A.

In Step S211, the plan generation unit 81 determines that the heating loosening operation is not performed, in accordance with the first rule. That is, the plan generation unit 81 determines all control target periods of the next day as the heating normal operation period. Here, the plan generation unit 81 follows the first rule indicated in the second row of the period definition LUT 191 based on a point that specifying the warmth period is not possible and a point that the heat exposure period is not specified.

In Step S212, the plan generation unit 81 generates the control data in accordance with the second rule such that the control based on the setting temperature designated by the user is executed throughout the day. The control data is packaged as one piece of the operation plan information similar to a case of including the heating loosening operation period, and then is registered in the operation plan DB 92 together with the identification information and the execution date.

In Step S213, the plan generation unit 81 determines the cooling loosening operation period in accordance with the first rule. Here, the plan generation unit 81 follows the first rule indicated in the third row of the period definition LUT 191 based on a point that cooling is set.

Specifically, the plan generation unit 81 determines the cooling loosening operation period as a period from a time before 30 minutes from the end time point of the warmth period to 6:00 AM on the next day, in accordance with the first rule. In the first embodiment, the plan generation unit 81 handles the period from 0:00 to 24:00 of one day as one control target period corresponding to one piece of the operation plan information. Therefore, the plan generation unit 81 classifies the control target period into the first sub-period from 0:00 to 6:00, the second sub-period before 30 minutes (specifically, 17:30) from the end time point of the warmth period from 6:00, and the third sub-period from 17:30 to 24:00. The plan generation unit 81 determines the first sub-period and the third sub-period as the cooling loosening operation period, and determines the second sub-period as the cooling normal operation period.

In Step S214, the plan generation unit 81 generates the control data for each sub-period in accordance with the air temperature control LUT 192. In the above-described example, the plan generation unit 81 generates the first control data and the third control data such that the cooling loosening operation is executed in the first sub-period and the third sub-period. The plan generation unit 81 generates the second control data such that the cooling normal operation is executed in the second sub-period.

The plan generation unit 81 corrects the setting temperature to "(the installation air temperature)+0.5° C." in the cooling loosening operation period in the first sub-period and the third sub-period, in accordance with the air temperature control LUT 192. The plan generation unit 81 generates the first control data and the third control data such that the air-conditioner main body 33 is controlled based on the corrected setting temperature. The plan generation unit 81 generates the second control data in accordance with the air temperature control LUT 192 such that the air-conditioner main body 33 is controlled up to the setting temperature set by the user in the cooling normal operation period in the second sub-period. Similar to the heating operation, in S210, the control data is arranged in time series, packaged into one piece of the operation plan information, and registered in the operation plan DB 92 together with the identification information and the execution date.

Operation Plan Database and Operation Plan Information

FIG. 13 is a diagram illustrating an example of the data structure of the operation plan DB. The operation plan DB 92 is configured by registering a plurality of pieces of operation plan information generated as described above. One piece of operation plan information includes one or a plurality of pieces of control data as described above. The control data is generated in accordance with the number of sub-periods obtained by dividing the control target period.

As an example, the operation plan DB 92 includes items of the execution target, the execution date, the control data ID, the control target period, the type of operation, the operation mode, and the setting temperature.

Identification information for uniquely identifying the air conditioning target space is stored in the item of the execution target. Similar to the characteristic DB 90, the user ID, the terminal ID, the air conditioner ID, and the like may be adopted as the identification information. Further, information for specifying the area in which the air conditioning target space is, such as a postal code, may be included in the item of the execution target.

The date on which the energy-saving automatic operation is executed based on the operation plan information is stored in the item of the execution date.

Identification information for uniquely identifying one or a plurality of pieces of control data included in the operation plan information is stored in the item of the control data ID. For example, the control data ID "period 01" indicates that the control data corresponds to the first sub-period. For example, preferably, the ascending order of the control data IDs match in time series.

Information for defining start time points and end time points of a plurality of sub-periods obtained by dividing the control target period of 0:00 to 24:00 of the next day is stored in the item of the control target period.

Information indicating whether the normal operation or the loosening operation is executed for the corresponding sub-period is stored in the item of the type of operation. Information indicating the operation mode to be executed during the corresponding sub-period is stored in the item of the operation mode. In the first embodiment, information indicating heating or cooling is stored. The room air temperature to be the target in the air conditioning target space during the corresponding sub-period is stored in the item of the setting temperature.

The plan supply unit 82 extracts, from the operation plan information registered in the operation plan DB 92, operation plan information of which the control target period is approaching. Then, the plan supply unit 82 supplies the extracted operation plan information to each air conditioner 11 as an execution target. For example, in the example illustrated in FIG. 13, the plan supply unit 82 supplies the operation plan information for execution on Nov. 28, 2018 to the air conditioner 11 in the room of the user A before 0:00 on Nov. 28, 2018.

Thus, the operation control unit 42 of the air conditioner 11 in the room of the user A executes the heating normal operation based on the setting temperature 22° C. during a period of 0:00 and 6:30 on Nov. 28, 2018 in accordance with the operation plan information illustrated in FIG. 13. The operation control unit 42 executes the heating loosening operation based on the setting temperature 21.5° C. during a period of 6:30 and 12:00 on the same day. The operation control unit 42 executes the heating normal operation based on the setting temperature 22° C. during a period of 12:00 and 24:00 on the same day.

As a result, heating is loosened only in the vicinity of the overlap period between the heat exposure period in which the room of Mr/Miss/Mrs. A is warmed by the benefit of sunlight and the warmth period in which sufficient sunlight is observed to raise the room air temperature. However, as described above, the room air temperature tends to rise or is maintained to be warm due to the benefit of sunlight. Thus, even if the heating is loosened, the warmth of the room is maintained, and the comfort of the indoor environment is not impaired. On the contrary, it is possible to suppress the overheat of the room and to reduce the power consumption. In addition, the heating loosening operation period is determined after grasping the tendency of each room regarding the period influenced by sunlight from the transition in the solar irradiance, without following the change in the solar irradiance in the room that changes moment by moment. Therefore, the heating loosening operation is executed only for a period desired for the room without being influenced by the actual weather, and thus it is possible to avoid the inconvenience that the control content is changed in a short time and becomes unstable.

Second Embodiment

Another embodiment of the disclosure will be described below. For convenience of the description, members having the same functions as the members described in the above embodiment will be denoted by the same reference signs, and the description thereof will not be repeated.

In a second embodiment, the plan generation unit 81 refers to outdoor air temperature prediction information (predicted value of the outdoor air temperature) on the same day in addition to the solar irradiance prediction information on a certain day, and specifies a time of day when the air temperature rises or falls rapidly, within a short time (for example, one hour). The plan generation unit 81 may correct the start time point or the end time point of the loosening operation period, add the loosening operation period, or delete the loosening operation period, based on a time of day at which the air temperature is predicted to rise or fall rapidly.

Data Structure

FIG. 14 is a graph illustrating an example of the outdoor air temperature prediction information included in the weather forecast information of a certain area. A vertical axis of the graph indicates the outdoor air temperature predicted to be observed in the above-described area. A horizontal axis indicates a time of day at which the outdoor air temperature is predicted to be observed.

The plan generation unit 81 specifies, as a rapid air temperature change period, a time duration between a time point at which an air temperature changes rapidly by a predetermined air temperature or more and a time point at which an air temperature change in the same direction as a direction of the air temperature change that continues from the time point ends, in the outdoor air temperature prediction information in an area on a certain day. As an example, when generating the operation plan information in heating, the plan generation unit 81 specifies a rapid rise time point at which the air temperature rises by 3° C. or more in comparison to the air temperature before one hour, and specifies a period in which the increase of the air temperature from the rapid rise time point continues, as a rapid air temperature change period, in particular, as a rapid air temperature rise period. In the example illustrated in FIG. 14, the plan generation unit 81 specifies a period from 10:00 when the air temperature rises rapidly to 13:00 when the air temperature rise ends, as the rapid air temperature rise period.

When generating the operation plan information in cooling, the plan generation unit 81 specifies a rapid decrease time point at which the air temperature rapidly decreases by 3° C. or more in comparison to the air temperature before one hour.

Generation Rule

FIG. 15 is a diagram illustrating an example of the data structure of the generation rule. In the second embodiment, the generation rule 91 includes a period definition LUT 193 based on the outdoor air temperature in addition to a period definition LUT 191 based on the solar irradiance and the air temperature control LUT 192.

The period definition LUT 193 is used when the plan generation unit 81 corrects the loosening operation period. As an example, the period definition LUT 193 includes items of the setting condition, a temperature condition, and a third rule. The item of the setting condition is similar to the item of the setting condition in the period definition LUT 191.

A condition regarding the outdoor air temperature prediction information in an area in which the user house 21 is located is stored in the item of the temperature condition. Specifically, the condition of whether or not the rapid air temperature rise period or the rapid air temperature decrease period is specified on a day in the area, based on the outdoor air temperature prediction information of the day (for example, the next day) on which the energy-saving automatic operation is executed based on the operation plan information is stored.

A rule of the operation plan information to be corrected by the plan generation unit 81 in accordance with the above setting condition and temperature condition is stored in the item of the third rule.

The plan generation unit 81 further may refer to the period definition LUT 193 and generate the operation plan information such that the loosening operation is executed before the air temperature changes rapidly, by combining the condition based on the solar irradiance and the condition based on the outdoor air temperature.

Figure 16:
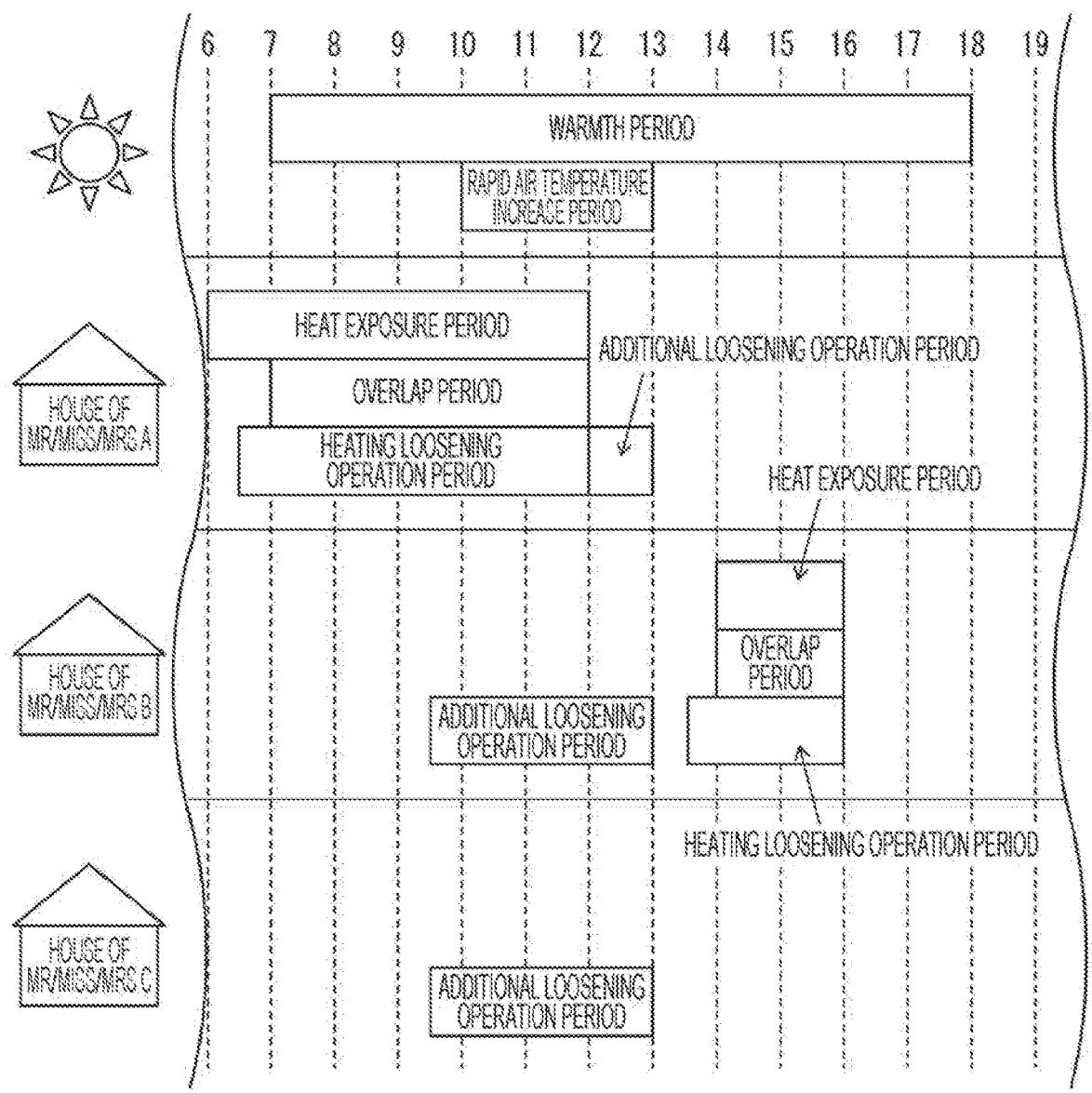
FIG. 16 is a timing chart illustrating an example of various periods defined for each room in order to generate operation plan information.

FIG. 16 is a timing chart illustrating an example of various periods defined for each room in order for the cloud server 14 to generate operation plan information for the next day in a certain area. In the timing chart of FIG. 16, the heating loosening operation period is corrected based on the outdoor air temperature prediction information in comparison to the timing chart illustrated in FIG. 11.

Firstly, the plan generation unit 81 specifies the rapid air temperature change period based on the outdoor air temperature prediction information, and specifies a time duration including the rapid air temperature change period, as the loosening operation period. Specifically, firstly, the plan generation unit 81 specifies the rapid air temperature rise period (rapid air temperature change period) as a period of 10:00 to 13:00 based on the outdoor air temperature prediction information illustrated in FIG. 14. The plan generation unit 81 further specifies 9:30 to 13:00 as the heating loosening operation period in accordance with the period definition LUT 193 illustrated in FIG. 15.

In the operation plan information of the room of Mr/Miss/Mrs. A, a period from 6:30 to 12:00 is specified as the heating loosening operation period based on the solar irradiance. Thus, the plan generation unit 81 corrects the operation plan information of the room of Mr/Miss/Mrs. A by extending the end time point of the heating loosening operation period up to 13:00.

In the operation plan information of the rooms of Mr/Miss/Mrs. B and Mr/Miss/Mrs. C, a time duration from 9:30 to 13:00 is specified as the heating normal operation period based on the solar irradiance. Thus, the plan generation unit 81 corrects the operation plan information of the rooms of Mr/Miss/Mrs. B and Mr/Miss/Mrs. C by adding the time duration from 9:30 to 13:00 as the heating loosening operation period.

For example, it is assumed that the state of the atmosphere changes depending on the day, by covering the area with warm air or cold air, and thus the outdoor air temperature changes rapidly regardless of the solar irradiance. According to the above-described configuration, it is possible to execute an automatic operation with suppressed power consumption by a stable control without impairing the comfort while responding to a rapid change in outdoor air temperature caused by factors other than the solar irradiance as described above.

Operation Plan Database and Operation Plan Information

FIG. 17 is a diagram illustrating an example of the data structure of the operation plan DB. In particular, FIG. 17 illustrates the operation plan information generated for the room of Mr/Miss/Mrs. B by the plan generation unit 81 according to the second embodiment among pieces of the operation plan information registered in the operation plan DB.

When one piece of operation plan information is configured by multiple pieces of control data, it is possible to divide one piece of operation plan information into blocks configured by a predetermined number of pieces of control data and to handle the one piece of operation plan information. In the second embodiment, as an example, when more than three pieces of control data are generated for one piece of operation plan information, three pieces of control data are collected into one block and transmission and reception are performed for each block.

The data structure of the operation plan DB 92 illustrated in FIG. 17 is different from the data structure of the operation plan DB 92 illustrated in FIG. 13 in that the operation plan DB 92 further includes an item of a block ID. The other items are as described in the operation plan DB 92 illustrated in FIG. 13.

A block ID for uniquely identifying each of blocks obtained by dividing the operation plan information into a plurality of blocks is stored in the item of the block ID. In the second embodiment, one block is configured by three pieces of control data. Therefore, the block ID of the block is associated with the three pieces of control data collected in one block. Preferably, the pieces of control data are collected into blocks in time series, and the ascending order of the block IDs matches in time series.

In the second embodiment, the plan supply unit 82 transmits the operation plan information for each block. As an example, the plan supply unit 82 supplies the two blocks of the operation plan information in time for the operation start time point included in the first control data in the first block. Then, if the three pieces of control data included in one block are processed in the air conditioner 11 and the one block is completed, the plan acquisition unit 41 of the air conditioner 11 requests the cloud server 14 for the next new block. The plan supply unit 82 supplies the third block in response to the request from the air conditioner 11. Thereafter, the plan supply unit 82 sequentially supplies new blocks in response to a request from the air conditioner 11 each time one block is completed.

According to the above-described configuration, in the storage unit 32 of the air conditioner 11, the area for storing the operation plan information only needs to be secured for two blocks. Therefore, it is possible to reduce the storage capacity of the storage unit 32 of the air conditioner 11 in comparison to a case where pieces of operation plan information for the control target period of one day are collectively transmitted.

Further, the plan generation unit 81 of the cloud server 14 may correct the control data in the block registered in the operation plan DB 92 at hand until supplying the block. As described above, with a configuration in which the operation plan information is divided into blocks and sequentially supplied, the plan generation unit 81 may adjust control data in each block to have the more appropriate content until the operation plan information is supplied, based on the latest weather forecast information updated every moment.

Modification Examples

The cloud server 14 may include an estimation unit that estimates a floor plan of the air conditioning target space by analyzing a large amount of indoor solar irradiance information accumulated every day for each air conditioning target space, as illustrated in FIG. 5. Here, the floor plan refers to, for example, the direction in which the air conditioner 11 is installed, the direction in which the window is located, and the position relationship between the air conditioner 11 and the window.

The plan generation unit 81 is configured to generate control data capable of more detailed control including the air volume and the wind direction based on the floor plan of the air conditioning target space estimated by the estimation unit. For example, the plan generation unit 81 may determine the air volume and the direction of heating such that a warm wall is created near the window for a room with a certain floor plan, and include the determination in the control data.

The cloud server 14 may include an evaluation unit that analyzes the sensor value of room air temperature acquired by the temperature sensor 34*a* in the operation result information and evaluates the heat insulation performance of the air conditioning target space. The evaluation unit evaluates the heat insulation performance of the air conditioning target space based on the amount of change in room air temperature with the lapse of time after heating or cooling is stopped.

The plan generation unit 81 is configured to adjust the start time point or the end time point of the loosening operation period based on the heat insulation performance of the air conditioning target space evaluated by the evaluation unit. For example, for a room with high heat insulation performance, it is possible to make the start time point of the heating loosening operation period earlier than the regulation by the generation rule 91.

In the second embodiment, the configuration in which the plan generation unit 81 determines the loosening operation period based on the warmth period specified based on the solar irradiance prediction information, the heat exposure period specified based on the indoor solar irradiance information, and the rapid air temperature change period specified based on the outdoor air temperature prediction information is described. However, the configuration of the plan generation unit 81 is not limited to the above description. The plan generation unit 81 may be configured to determine the loosening operation period based on the heat exposure period specified based on the indoor solar irradiance information and the rapid air temperature change period specified based on the outdoor air temperature prediction information.

In the first and second embodiments, the configuration in which the plan generation unit 81 determines the cooling loosening operation period based on the warmth period specified based on the solar irradiance prediction information and the fixed time of day defined by the period definition LUT 191 is described. However, the configuration of the plan generation unit 81 is not limited to the above description. The plan generation unit 81 may further generate the operation plan information in cooling for each air conditioning target space by further considering the heat exposure period specified based on the indoor solar irradiance information. For example, when the heat exposure period overlaps the cooling loosening operation period determined in accordance with the warmth period and the period definition LUT 191, the plan generation unit 81 may correct the period overlapping the heat exposure period to the cooling normal operation period.

Implementation Example by Software

The control block (in particular, the characteristic determination unit 80, the plan generation unit 81, and the plan supply unit 82) of the cloud server 14 may be realized by a logic circuit (hardware) formed by an integrated circuit (IC chip) or the like or by software.

The control block (in particular, the plan acquisition unit 41, the operation control unit 42, and the result report unit 43) of the air conditioner 11 may be realized by a logic circuit (hardware) formed by an integrated circuit (IC chip) or the like, or may be realized by software.

The control block (in particular, the remote control unit 61 and the setting unit 62) of the portable terminal 15 may be realized by a logic circuit (hardware) formed by an integrated circuit (IC chip) or the like, or may be realized by software.

In the latter case, the cloud server 14, the air conditioner 11, and the portable terminal 15 include a computer that executes commands of a program that is software that realizes the functions. The computer includes, for example, at least one processor (control device) and at least one computer readable recording medium that stores the program. In the computer, the processor reads the program from the recording medium and executes the program to achieve the object of the disclosure. As the processor, for example, a central processing unit (CPU) may be used. As the recording medium, a "non-transitory medium" such as a read only memory (ROM), a tape, a disk, a card, a semiconductor memory, or a programmable logic circuit may be used. Further, a random access memory (RAM) and the like that loads the program may be further provided. The program may be supplied to the computer through any transmission medium (communication network, broadcast wave, and the like) capable of transmitting the program. One aspect of the disclosure may also be realized in the form of a data signal embedded in a carrier wave, in which the program is embodied by electronic transmission.

SUMMARY

According to a first aspect of the disclosure, a server (cloud server 14) communicates, via a network (wide area communication network 22), with one or a plurality of air conditioners 11 that execute either a normal operation or a loosening operation that consumes less power than the normal operation. The server includes a determination unit (characteristic determination unit 80) that determines a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by the solar radiation, a generation unit (plan generation unit 81) that generates operation plan information of at least designating a loosening operation period based on the heat exposure period, the loosening operation period being a time duration in which the air conditioner that performs air conditioning for the air conditioning target space is caused to execute the loosening operation, and a supply unit (plan supply unit 82) that supplies the operation plan information to the air conditioner via the network to cause the air conditioner to execute the loosening operation in the loosening operation period.

According to the above configuration, the generation unit can determine the loosening operation period of the air conditioner in consideration of the time duration in which the air conditioning target space is likely to be influenced by the solar radiation. For example, the heating loosening operation period may be determined based on the heat exposure period, and the air conditioner may be caused to execute the heating loosening operation in the heating loosening operation period. It is considered that the air temperature in the air conditioning target space tends to rise during the heat exposure period being the time duration in which the air temperature is influenced by the solar radiation. Thus, for example, even though the heating operation is loosened in the vicinity of the heat exposure period, it is possible to keep the air temperature in the air conditioning target space to be warm and to suppress undesirable power consumption by suppressing overheat. If the cooling operation is loosened while avoiding the vicinity of the heat exposure period, it is possible to avoid the rise in room air temperature and to realize the energy-saving automatic operation without impairing the comfort in the air conditioning target space.

Since the heat exposure period being the time duration in which the air temperature is likely to be influenced by solar radiation is determined in advance by the determination unit, the control contents of the air conditioner are not changed to follow the indoor solar irradiance that changes from moment to moment. Thus, the control is stable. As a result, an effect in that it is possible to realize an air conditioning control system capable of executing a stable energy-saving automatic operation suitable for an air conditioning target space considering an impact of an external environment on the air conditioning target space is exhibited.

In the server according to a second aspect of the disclosure, in the above-described first aspect, the generation unit may specify, as a warmth period, a time duration in which it is predicted that solar irradiance sufficient to influence an indoor environmental change is observed, based on a predicted value (solar irradiance prediction information) of the solar irradiance, which is provided from another device (service server 16), and determine the loosening operation period based on the overlap period in which the heat exposure period overlaps the warmth period.

According to the above configuration, the generation unit may determine the loosening operation period based on the overlap period being the time duration in which both time durations overlap each other, in consideration of not only the time duration in which the air conditioning target space is likely to be influenced by solar radiation, but also the time duration in which the solar radiation observed outside easily influences the indoor environment. It is considered that, in particular, the air temperature in the air conditioning target space tends to rise during the overlap period. Since the loosening operation period is determined considering the above-described overlap period, it is possible to execute the stable energy-saving automatic operation more suitable for each air conditioning target space while considering the influence of the external environment on the air conditioning target space.

In the server according to a third aspect of the disclosure, in the above-described second aspect, the generation unit may determine a time duration including the overlap period as the heating loosening operation period in which a heating operation is loosened.

According to the above configuration, the heating loosening operation period is determined so as to include at least the overlap period in which the air temperature in the air conditioning target space is considered to tend to rise particularly. According to such operation plan information, the air conditioner can loosen the heating at least during the overlap period in which the air temperature tends to rise particularly. As a result, it is possible to execute the stable energy-saving automatic operation more suitable for each air conditioning target space without impairing the comfort in the air conditioning target space.

In the server according to a fourth aspect of the disclosure, in the above-described third aspect, the generation unit may determine, as the heating loosening operation period, a time duration from a time point before a predetermined period from a start time point of the overlap period to an end time point of the overlap period.

According to the above configuration, the heating loosening operation period is determined for the overlap period in which the air temperature in the air conditioning target space is considered to tend to rise particularly and the time duration before the predetermined time when the overlap period starts. It is considered that the room air temperature does not immediately drop from the time point when the heating is loosened, and the room air temperature is maintained to some extent for a predetermined time when the heating starts to be loosened. It is possible to suppress the power consumption more without lowering the room air temperature, by accelerating the heating loosening operation period slightly before the start of the overlap period.

In the server according to a fifth aspect of the disclosure, in the above-described second to fourth aspects, the generation unit may specify, as a rapid air temperature change period, a time duration between a time point at which an air temperature changes rapidly by a predetermined air temperature or more and a time point at which an air temperature change in the same direction as a direction of the air temperature change that continues from the time point ends, based on a predicted value (outdoor air temperature prediction information) of an outdoor air temperature provided from another device, and determine a time duration including the rapid air temperature change period as the loosening operation period.

According to the above-described configuration, it is possible to operate the air conditioner, for example, such that the heating action is loosened in accordance with the time duration in which a rapid increase in the outdoor air temperature is expected, or the time duration in which the rapid decrease in the outdoor air temperature is expected to occur. As described above, it is possible to cause the air conditioner to execute the loosening operation in advance of the rapid change of the air temperature, by further considering the requirements based on the outdoor air temperature. As a result, it is possible to realize the energy-saving automatic operation capable of proactively responding to a rapid air temperature change that has little correlation with the movement of the sun.

In the server according to a sixth aspect of the disclosure, in the above-described first to fifth aspects, the generation unit may generate operation plan information of designating, as a setting temperature in the loosening operation period, a corrected setting temperature obtained by correcting a setting temperature designated by a user of the air conditioner in a direction close to an outdoor air temperature.

According to the above configuration, during the loosening operation period, the setting temperature is loosened more than the setting temperature designated by the user. Thus, it is possible to suppress the power consumption in comparison to a case where the normal operation is performed in accordance with the setting temperature as designated by the user.

According to a seventh aspect of the disclosure, an air conditioning control system (air conditioner control system 1) includes one or a plurality of air conditioners 11 that execute either a normal operation or a loosening operation that consumes less power than the normal operation, and a server (cloud server 14) that communicates with the air conditioner via a network. The server includes a determination unit that determines a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by the solar radiation, a generation unit that generates operation plan information of at least designating a loosening operation period based on the heat exposure period, the loosening operation period being a time duration in which the air conditioner that performs air conditioning for the air conditioning target space is caused to execute the loosening operation, and a supply unit that supplies the operation plan information to the air conditioner via the network to cause the air conditioner to execute the loosening operation in the loosening operation period. The air conditioner includes an acquisition unit (plan acquisition unit 41) that acquires the operation plan information from the server, and an operation control unit 42 that executes the loosening operation in the loosening operation period designated in the acquired operation plan information. According to the above-described configuration, effects similar to those in the first aspect are exhibited.

According to an eighth aspect of the disclosure, a control method of a server that communicates, via a network, with one or a plurality of air conditioners that execute either a normal operation or a loosening operation that consumes less power than the normal operation includes determining (S102) a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by the solar radiation, generating (S104) operation plan information of at least designating a loosening operation period based on the heat exposure period, the loosening operation period being a time duration in which the air conditioner that performs air conditioning for the air conditioning target space is caused to execute the loosening operation, and supplying (S105) the operation plan information to the air conditioner via the network to cause the air conditioner to execute the loosening operation in the loosening operation period. According to the above-described method, effects similar to those in the first aspect are exhibited.

The server according to each aspect of the disclosure may be realized by a computer. In this case, a server control program that causes the computer to operate by causing the computer to operate as each unit (software element) in the server, and a computer readable recording medium in which the server control program is recorded are also included in the scope of the disclosure.

The disclosure is not limited to the above-described embodiments, and various modifications can be made within the scope of the aspects, and the embodiments obtained by appropriately combining the technical means disclosed in the different embodiments. Is also included in the technical scope of the disclosure. Furthermore, new technical features can be formed by combining the technical means disclosed in each embodiment.

The present disclosure contains subject matter related to that disclosed in Japanese Priority Patent Application JP 2019-163825 filed in the Japan Patent Office on Sep. 9, 2019, the entire contents of which are here by incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A server that communicates, via a network, with one or a plurality of air conditioners that execute either a normal operation or a loosening operation that consumes less power than the normal operation, the server comprising:
- a determination unit that determines a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by solar radiation;
- a generation unit that generates operation plan information of at least designating a loosening operation period based on the heat exposure period, the loosening operation period being a time duration in which the air conditioner that performs air conditioning for the air conditioning target space is caused to execute the loosening operation; and
- a supply unit that supplies the operation plan information to the air conditioner via the network to cause the air conditioner to execute the loosening operation in the loosening operation period, wherein the generation unit
specifies, as a warmth period, a time duration in which it is predicted that solar irradiance sufficient to influence an indoor environmental change is observed, based on a predicted value of solar irradiance, which is provided from another device, and
determines the loosening operation period based on an overlap period in which the heat exposure period overlaps the warmth period.

2. The server according to claim 1, wherein the generation unit determines a time duration including the overlap period, as a moderate heating operation period in which a heating operation is moderated.

3. The server according to claim 2, wherein the generation unit determines, as the moderate heating operation period, a time duration from a time point before a predetermined period from a start time of the overlap period to an end time of the overlap period.

4. The server according to claim 1, wherein the generation unit
specifies, as a rapid air temperature change period, a time duration between a first time point at which air temperature changes rapidly by a predetermined air temperature amount or more and a second time point at which air temperature changes in a same direction as a direction of the rapid air temperature change ends, based on a predicted value of an outdoor air temperature provided from another device, and
determines a time duration including the rapid air temperature change period as the loosening operation period.

5. The server according to claim 1, wherein the generation unit generates the operation plan information designating a setting temperature in the loosening operation period the setting temperature being a corrected value of a setting temperature designated by a user of the air conditioner in a direction so as to close to an outdoor air temperature.

6. A non-transitory computer readable medium that stores a control program for causing a computer to function as the server according to claim 1, and that stores the control program for causing the computer to function as the determination unit, the generation unit, and the supply unit.

7. An air conditioning control system comprising:
one or a plurality of air conditioners that execute either a normal operation or a loosening operation that consumes less power than the normal operation; and
a server that communicates with the air conditioner via a network,
wherein the server includes
- a determination unit that determines a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by solar radiation,
- a generation unit that generates operation plan information of at least designating a loosening operation period based on the heat exposure period, the loosening operation period being a time duration in which the air conditioner that performs air conditioning for the air conditioning target space is caused to execute the loosening operation, and
- a supply unit that supplies the operation plan information to the air conditioner via the network to cause the air conditioner to execute the loosening operation in the loosening operation period, and the air conditioner includes
- an acquisition unit that acquires the operation plan information from the server, and
- an operation control unit that executes the loosening operation in the loosening operation period designated in the acquired operation plan information, and the generation unit
specifies, as a warmth period, a time duration in which it is predicted that solar irradiance sufficient to influence an indoor environmental change is observed, based on a predicted value of solar irradiance, which is provided from another device, and
determines the loosening operation period based on an overlap period in which the heat exposure period overlaps the warmth period.

8. A control method of a server that communicates, via a network, with one or a plurality of air conditioners that execute either a normal operation or a loosening operation that consumes less power than the normal operation, the method comprising:
determining a heat exposure period based on indoor solar irradiance information for each air conditioning target space, the indoor solar irradiance information indicating a transition of solar irradiance measured in an air conditioning target space as a target in which the air conditioner performs air conditioning, and the heat exposure period being a time duration in which an environment in the air conditioning target space is likely to be influenced by solar radiation;
specifying, as a warmth period, a time duration in which it is predicted that solar irradiance sufficient to influence an indoor environmental change is observed, based on a predicted value of solar irradiance, which is provided from another device;
generating operation plan information of at least designating a loosening operation period based on the heat exposure period, the loosening operation period being a time duration in which the air conditioner that performs air conditioning for the air conditioning target space is caused to execute the loosening operation;

determining the loosening operation period based on an overlap period in which the heat exposure period overlaps the warmth period; and supplying the operation plan information to the air conditioner via the network to cause the air conditioner to execute the loosening operation in the loosening operation period.

* * * * *